(12) United States Patent
Garg et al.

(10) Patent No.: US 12,105,876 B2
(45) Date of Patent: Oct. 1, 2024

(54) SYSTEM AND METHOD FOR USING GESTURES AND EXPRESSIONS FOR CONTROLLING SPEECH APPLICATIONS

(71) Applicant: Wispr AI, Inc., South San Francisco, CA (US)

(72) Inventors: Sahaj Garg, Foster City, CA (US); Tanay Kothari, San Francisco, CA (US); Anthony Leonardo, Broadlands, VA (US)

(73) Assignee: Wispr AI, Inc., South San Francisco, CA (US)

( * ) Notice: Subject to any disclaimer, the term of this patent is extended or adjusted under 35 U.S.C. 154(b) by 0 days.

(21) Appl. No.: 18/358,268

(22) Filed: Jul. 25, 2023

(65) Prior Publication Data

US 2024/0220016 A1 Jul. 4, 2024

Related U.S. Application Data

(60) Provisional application No. 63/437,088, filed on Jan. 4, 2023.

(51) Int. Cl.
  *G06F 3/16* (2006.01)
  *G06F 3/01* (2006.01)
  *G06N 20/00* (2019.01)

(52) U.S. Cl.
  CPC ............ *G06F 3/015* (2013.01); *G06N 20/00* (2019.01); *G06F 2203/011* (2013.01)

(58) Field of Classification Search
  CPC ........ G16H 20/70; G16H 40/67; G16H 40/60; A61M 21/00; G02B 27/017; G02C 11/10;
  (Continued)

(56) References Cited

U.S. PATENT DOCUMENTS 8,082,149 B2    12/2011  Schultz et al.
9,013,264 B2 *   4/2015  Parshionikar .......... G08B 21/06
                                                        340/576
(Continued)

FOREIGN PATENT DOCUMENTS

CA    2923979 A1 *  3/2014  ........... A61B 5/0006
CA    2942852 A1 *  9/2014  ............. A61B 5/163
(Continued)

OTHER PUBLICATIONS

Gaddy et al., An Improved Model for Voicing Silent Speech. Proceedings of the 59th Annual Meeting of the Association for Computational Linguistics and 11th International Joint Conference on Natural Language Processing. Aug. 1-6, 2021. pp. 175-181.

(Continued)

*Primary Examiner* — Steven P Sax
(74) *Attorney, Agent, or Firm* — Wolf, Greenfield & Sacks, P.C.

(57) ABSTRACT

Methods and systems are provided for detecting and processing gestures, expressions (e.g., facial), tone and/or gestures of the user for the purpose of improving the quality and speed of interactions with computer-based systems. Such information may be detected by one or more sensors such as, for example, electromyography (EMG) sensors used to monitor and record electrical activity produced by muscles that are activated. Other sensor types may be used, such as optical, inertial measurement unit (IMU), or other types of bio-sensors. The system may use one or more sensors to detect speech alone or in combination with gestures, expressions (e.g., facial), tone and/or gestures of the user to provide input or control of the system.

25 Claims, 23 Drawing Sheets

(58) Field of Classification Search
CPC ......... G09G 3/003; G06F 16/90; G06F 3/015;
G06F 3/0481; G06F 16/00; G06F
2203/011; G06F 30/27; A61B 5/163;
A61B 5/6803; A61B 5/398; A61B 5/165;
A61B 5/4064; A61B 5/74; H04W 4/30;
H04W 4/029; H04L 67/12; H04L 12/16;
H04L 41/16; G06N 20/00; G16C 20/70;
G05D 2101/15; G06T 5/60; G06V 10/70

See application file for complete search history.

(56) References Cited

U.S. PATENT DOCUMENTS

| | | | |
|---|---|---|---|
| 10,559,145 B1 * | 2/2020 | Almehmadi | G06N 3/045 |
| 10,878,818 B2 | 12/2020 | Kapur et al. | |
| 2012/0290950 A1 * | 11/2012 | Rapaport | H04L 51/52 |
| | | | 715/753 |
| 2015/0313496 A1 * | 11/2015 | Connor | A61B 5/369 |
| | | | 600/301 |
| 2016/0314781 A1 | 10/2016 | Schultz et al. | |
| 2017/0061034 A1 * | 3/2017 | Ritchey | G09G 5/026 |
| 2017/0131768 A1 * | 5/2017 | Budavari | G06F 3/015 |
| 2018/0046851 A1 * | 2/2018 | Kienzle | G06F 3/0481 |
| 2018/0239956 A1 * | 8/2018 | Tadi | G06F 18/2132 |
| 2019/0074012 A1 | 3/2019 | Kapur et al. | |
| 2020/0258535 A1 | 8/2020 | Vatanparvar et al. | |
| 2021/0124422 A1 * | 4/2021 | Forsland | G06F 1/163 |
| 2021/0183383 A1 | 6/2021 | Volovich et al. | |
| 2022/0137702 A1 | 5/2022 | Min et al. | |
| 2022/0160296 A1 * | 5/2022 | Rahmani | A61B 5/6803 |
| 2022/0208194 A1 | 6/2022 | Rameau et al. | |
| 2023/0072423 A1 * | 3/2023 | Osborn | G16H 20/30 |
| 2023/0077010 A1 | 3/2023 | Zhang et al. | |
| 2023/0130770 A1 * | 4/2023 | Miller | G06N 20/00 |
| | | | 345/156 |
| 2023/0157757 A1 * | 5/2023 | Braido | G06T 19/003 |
| | | | 345/419 |
| 2023/0157762 A1 * | 5/2023 | Braido | A61B 34/37 |
| | | | 600/424 |

FOREIGN PATENT DOCUMENTS

| | | | | |
|---|---|---|---|---|
| CA | 2998687 A1 | * | 5/2018 | ........... A61B 5/1104 |
| CA | 3164001 A1 | * | 7/2021 | ........... A61B 5/0022 |
| CA | 2942852 C | * | 3/2023 | ............ A61B 5/163 |
| CA | 2957766 C | * | 10/2023 | ............ A61B 18/02 |
| CN | 101902960 A | * | 12/2010 | ........... A61B 5/0488 |
| CN | 112424859 A | * | 2/2021 | ............ G06F 3/015 |
| CN | 114730391 A | * | 7/2022 | ........... A63F 13/332 |
| KR | 10-2015-0104345 A | | 9/2015 | |
| KR | 20200127150 A | * | 11/2020 | |
| WO | WO-2019040669 A1 | * | 2/2018 | ............... A61B 5/00 |
| WO | WO-2022020968 A1 | * | 2/2022 | ............ A61B 5/372 |
| WO | WO-2022245833 A2 | * | 11/2022 | |

OTHER PUBLICATIONS

Gaddy et al., Digital Voicing of Silent Speech. arXiv:2010.02960v1 [eess.AS] Oct. 6, 2020. 10 pages.

Kapur et al., Alterego: A Personalized Wearable Silent Speech Interface. Session 1B: Multimodel Interfaces. IUI. Mar. 5, 2018. 11 Pages.

Kapur, How AI Could Become an Extension of your mind. TED. YouTube. Jun. 6, 2019.

Meltzner et al., Development of sEMG sensors and algorithms for silent speech recognition. J Neural Eng. Aug. 2018;15(4):046031. doi: 10.1088/1741-2552/aac965. Epub Jun. 1, 2018. PMID: 29855428; PMCID: PMC6168082.

Meltzner et al., Silent Speech Recognition as an Alternative Communication Device for Persons with Laryngectomy. IEEE/ACM Trans Audio Speech Lang Process. Dec. 2017;25(12):2386-2398. doi: 10.1109/TASLP.2017.2740000. Epub Nov. 28, 2017. PMID: 29552581; PMCID: PMC5851476.

Purcher, Apple Invents a next-generation AirPods Sensor System that could measure Biosignals and Electrical Activity of a user's Brain. Jul. 20, 2023. 9 pages. https://www.patentlyapple.com/2023/07/apple-invents-a-next-generation-airpods-sensor-system-that-could-measure-biosignals-and-electrical-activity-of-a-users-brain.html [Last Accessed Aug. 21, 2023].

He et al., Unvoiced Speech Recognition Algorithm Based on Myoeletric Signal. ICMLC. Feb. 15-17, 2020. 7 Pages.

Herff et al., Impact of Different Feedback Mechanisms in EMG-based Speech Recognition. Interspeech. Aug. 28-31, 2011:2213-2216.

Ishak, Speaker Identification Based on Vocal Cords Vibrations signal: Effect of the Window. International Journal of Digital Information and Wireless Communications. Jan. 2018. Doi:10.17781/P002406. 6 Pages.

Jou et al., Articulatory Feature Classification Using Surface Electromyography. International Central for Advanced Technologies. IEEE. 2006. 4 Pages.

Jou et al., Towards Continuous Speech Recognition Using Surface Electromyography. Interspeech. Sep. 17-21, 2006. 4 Pages.

Karnjanedecha et al., Signal Modeling for High-Performance Robust Isolated Word Recognition. IEEE Transactions of Speech and Audio Processing. Sep. 2001;9(6):647-654.

Maier-Hein et al., Session Independent Non-Audible Speech Recognition Using Surface Electromyography. IEEE Workshop on Automatic Speech Recognition and Understanding. 2005. 6 Pages.

Maier-Hein, Speech Recognition Using Surface Electromyography. Diplomarbeit Thesis. Aug. 2005. 129 Pages.

Manabe et al., Unvoiced Speech Recognition using EMG—Mime Speech Recognition-.Short Talk: Brains, Eyes and Ears. CHI. Apr. 5-10, 2003. 2 Pages.

Jamil et al., A flexible Speech Recognition System for Cerebral Palsy Disabled. ICIEIS. 2011. pp. 42-55.

Polur et al., Experiments with Fast Fourier Transform, Linear Predictive and Cepstral Coefficients in Dysarthric Speech Recognition Algorithms Using Hidden Markov Model. IEEE Transactions on Neural Systems and Rehabilitation Engineering. Dec. 2005; 13(4):558-561.

Prajapati et al., A Survey on Isolated Word and Digit Recognition Using Different Techniques. International Journal of Computer Applications (0975-8887). Mar. 2017;161(3). 10 Pages.

Rajasekaran et al., Recognition of Speech Under Stress and in Noise. ICASSP. 1986. 4 Pages.

Schultz et al., Modeling coarticulation in EMG-based continuous speech recognition. ScienceDirect. Speech Communications 52 (2010). Dec. 2, 2009. 13 Pages.

Toruk et al., Short Utterance Speaker Recognition Using Time-Delay Neural Network. 16th International Multi-Conference on Systems, Signals & Devices (SSD'19). 2019. 4 Pages.

Wand, Advancing Electromyographic Continuous Speech Recognition. Signal Preprocessing and Modeling. Scientific Publishing. Jan. 14, 2014. 256 Pages.

Wand, Speaker-Adaptive Speech Recognition Based on Surface Electromyography. IJCBEST. 2009. 15 Pages.

Wand, Towards Real-life Application of EMG-based Speech Recognition by using Unsupervised Adaptation. Interspeech. Sep. 14-18, 2014. 5 Pages.

Wand et al., The EMG-UKA for Electromyographic Speech Processing. Interspeech. Sep. 14-18, 2019. 5 Pages.

Wand et al., Towards Speaker-Adaptive Speech Recognition Based on Surface Electromyography.ICBSSP. 2009. 8 Pages.

Zhou et al., Improved Phoneme-Based Myoelectric Speech Recognition. IEEE Transactions on Biomedical Engineering. Aug. 2009;56(8). 8 Pages.

U.S. Appl. No. 18/338,749, filed Jun. 21, 2023, Garg et al.
U.S. Appl. No. 18/358,236, filed Jul. 25, 2023, Garg et al.
U.S. Appl. No. 18/338,827, filed Jun. 21, 2023, Garg et al.

(56) References Cited

OTHER PUBLICATIONS

International Search Report and Written Opinion dated Apr. 26, 2024, in connection with International Application No. PCT/US24/10268.

* cited by examiner

SYSTEM AND METHOD FOR USING GESTURES AND EXPRESSIONS FOR CONTROLLING SPEECH APPLICATIONS

RELATED APPLICATIONS

This application claims the benefit under 35 U.S.C. § 119(e) of U.S. Provisional Application No. 63/437,088, entitled "SYSTEM AND METHOD FOR SILENT SPEECH DECODING," filed Jan. 4, 2023, the entire contents of which are incorporated herein by reference.

BACKGROUND

There are many existing systems for interacting with computer-based systems using speech captured from a user, as well as other input modalities through devices such as keyboards, mice, and other devices.

SUMMARY

In some aspects, it is appreciated that new modalities of interacting with computer-based systems by users would be beneficial. With new types of devices such as those that can detect and recognize user input such as silent speech, speech, and other user inputs, it would be helpful to create new modalities that permit users to interact with such systems more efficiently. For instance, it is appreciated that systems and devices that are configured to detect and process gestures, expressions (e.g., facial), tone and/or gestures of the user can be used for the purpose of improving the quality and speed of interactions with computer-based systems. The information detected can be used to improve interactions (e.g., through training of systems capable of learning) with the computer and may be used to provide additional inputs and control to these systems. In the case of interactive systems, such information may be used to more efficiently interact and control these systems in a user-centric way.

According to one aspect a system is provided. The system comprises a component configured to detect speech from a user, a component configured to detect a facial expression, tone, and/or a gesture of the user, and a component configured to determine at least one of a control or an output of the system responsive to the detected input speech and the detected facial expression, tone, and/or gesture of the user.

According to one embodiment, the gesture of the user is a facial or head gesture. According to one embodiment, the component configured to detect the speech from the user is configured to detect silent speech from the user. According to one embodiment, the component configured to detect the facial expression, tone, and/or gesture of the user is responsive to at least one EMG signal measured by a sensor in contact with the user. According to one embodiment, the component configured to detect the facial expression, tone, and/or gesture of the user is responsive to signals from one or more sensors configured to measure signals responsive to the facial expression, tone, and/or gesture of the user. According to one embodiment, the one or more sensors comprise one or more sensor types including an optical sensor, an inertial measurement sensor, a camera, or a biosensor. According to one embodiment, the one or more sensors are part of a wearable device positioned on the user. According to one embodiment, the system is configured to receive an electronic signal indicative of the speech and facial muscle activation patterns of the user when the user is articulating speech. According to one embodiment, the system further comprises at least one model, and wherein the at least one EMG signal is provided as input to the at least one model to determine an output indicating the facial expression, tone, and/or gesture of the user.

According to one embodiment, at least one model includes one or more of a statistical pattern recognition model, an unsupervised learning model, a semi-supervised learning model, a reinforcement learning model, and a machine learning model. According to one embodiment, the system further comprises at least one trained machine learning model, and wherein the at least one EMG signal is provided as input to the at least one machine learning model to determine one or more outputs indicating the facial expression, tone, and/or gesture and input speech from a user. According to one embodiment, the component configured to determine at least one of the control or the output of the system responsive to the detected input speech and the detected facial expression and/or gesture of the user is configured to create one or more output symbols responsive to the detected facial expression, tone, and/or gesture of the user. According to one embodiment, the component configured to determine at least one of the control or the output of the system responsive to the detected input speech and the detected facial expression and/or gesture of the user is configured to create one or more output audio signals responsive to the detected facial expression, tone, and/or gesture of the user. According to one embodiment, the one or more output symbols are positioned within an output text sequence generated responsive the detected input speech. According to one embodiment, the component configured to detect input speech from a user and the component configured to detect facial expression, a tone, and/or gesture of the user operate substantially simultaneously. According to one embodiment, the component configured to determine at least one of the control or the output of the system includes an interactive system that produces an output or response that is provided to the user. According to one embodiment, the control of the system in response to the detected facial expression, tone and/or gesture includes deactivating or canceling operation of the component that detects input speech. According to one embodiment, the control of the system in response to the detected gesture, facial expression, tone or gesture includes stopping the system while the system is in the process of providing an output or response to the user. According to one embodiment, the control of the system in response to the detected gesture, facial expression, tone or gesture is to stop the knowledge system while the knowledge system is determining a response. According to one embodiment, the one or more control functions of the knowledge system includes changing a mode of operation of the knowledge system responsive to the detected facial expression, tone and/or gesture of the user. According to one embodiment, the detected facial expression, tone, and/or gesture of the user is determined periodically or continuously in real time. According to one embodiment, the system further comprises a component configured to present, in a display of the computer system, a representation of the user based on the detected facial expression, tone, and/or gesture of the user. According to one embodiment, the output further indicates a micro-expression of the user.

According to one aspect, a method is provided. The method comprises of detecting speech from a user by at least one processor, detecting a facial expression, tone, and/or a gesture of the user by the at least one processor, and determining at least one of a control or an output of a system responsive to the detected input speech and the detected facial expression, tone, and/or gesture of the user.

According to one embodiment, the act of detecting a facial expression, tone, and/or a gesture of the user by the at least one processor includes an act of measuring at least one EMG signal by a sensor in contact with the user. According to one embodiment, the method further comprises providing at least one model, and providing the at least one EMG signal as an input to the at least one model to determine an output indicating the facial expression, tone, and/or gesture of the user. According to one embodiment, the method further comprises providing at least one trained machine learning model and providing the at least one EMG signal as an input to the at least one machine learning model to determine one or more outputs indicating the facial expression, tone, and/or gesture and input speech from a user.

According to one aspect a non-transitory computer-readable medium containing instruction that, when executed, cause at least one computer hardware processor to perform a method is provided. The method comprises detecting speech from a user by at least one processor, detecting a facial expression, tone, and/or a gesture of the user by the at least one processor, and determining at least one of a control or an output of a system responsive to the detected input speech and the detected facial expression, tone, and/or gesture of the user.

According to one aspect, a system is provided. The system comprises a speech input device wearable on a user and configured to measure an EMG signal when the user is speaking and at least one processor configured to provide a prompt to an interactive system to take an action or generate a response, receive a first EMG signal responsive to the user making a facial expression responsive to the action or the response, use a machine learning model and the EMG signal as input to the machine learning model to determine a feedback signal, and provide the feedback signal to the interactive system to cause the interactive system to take a new action or generate a new response in response to the feedback signal.

According to one embodiment, the feedback signal indicates a degree of confirmation to the response. According to one embodiment, the system further comprises a knowledge system, and wherein the degree of confirmation to the response is used to determine whether the knowledge system takes an action that was indicated by the response. According to one embodiment, the feedback signal is used by the interactive system to generate a response to the user that includes a question. According to one embodiment, the system receives and processes a second prompt provided by the user response to the question. According to one embodiment, the first and second prompts are provided as inputs to a knowledge system. According to one embodiment, the interactive system is configured to sample a new input or response based on the feedback signal. According to one embodiment, the feedback signal includes an indication of a facial or a head gesture. According to one embodiment, the feedback signal includes an indication of a frown, a smile, a head nod, or a head shake. According to one embodiment, the feedback signal indicates a frown, and the indication of the frown is used to cancel or clarify the prompt. According to one embodiment, the feedback signal indicates a smile, and the indication of the smile is used to confirm the action or the response. According to one embodiment, the at least one processor is further configured to generate a second prompt and is configured to receive another EMG signal from the speech input device when the user is speaking and using another machine learning model and the another EMG signal as input to the another machine learning model to generate the second prompt. According to one embodiment, the at least one processor is configured to provide a text prompt to a knowledge system to cause the knowledge system to perform an operation and/or generate a response, receive a feedback signal responsive to the performed operation or the response, cause the knowledge system to, based on the feedback signal, take a new operation different from the performed operation or generate a new response different from the generated response. According to one embodiment, the feedback comprises receiving a signal from the user that the knowledge system did not perform the operation or provide the response that the user desired. According to one embodiment, the system further comprises a speech input device wearable on a user and configured to receive an EMG signal when the user is speaking, receive an EMG signal when the user is making a facial expression responsive to the action or the response, and use a machine learning model and the EMG signal as input to the machine learning model to determine the feedback signal. According to one embodiment, the feedback signal indicates one of a smile, a frown, or a head gesture.

According to one aspect, a computer-implemented method used in a distributed computer system is provided. The method comprises measuring, by a speech input device wearable on a user, an EMG signal when the user is speaking and providing a prompt to an interactive system to take an action or generate a response, receiving a first EMG signal responsive to the user making a facial expression responsive to the action or the response, sing a machine learning model and the EMG signal as input to the machine learning model to determine a feedback signal, and providing the feedback signal to the interactive system to cause the interactive system to take a new action or generate a new response in response to the feedback signal.

According to one embodiment, the feedback signal indicates a degree of confirmation to the response. According to one embodiment, the system further comprises a knowledge system, and wherein the degree of confirmation to the response is used to determine whether the knowledge system takes an action that was indicated by the response. According to one embodiment, the method further comprises using the feedback signal by the knowledge system to generate a response to the user that includes a question. According to one embodiment, the system further comprises receiving and processing a second prompt provided by the user response to the question. According to one embodiment, the first and second prompts are provided as inputs to the knowledge system. According to one embodiment, the interactive system is configured to sample a new input or response based on the feedback signal.

According to one aspect, a non-transitory computer-readable medium containing instruction that, when executed, cause at least one computer hardware processor to perform a method is provided. The method comprises acts of measuring, by a speech input device wearable on a user, an EMG signal when the user is speaking and providing a prompt to an interactive system to take an action or generate a response, receiving a first EMG signal responsive to the user making a facial expression responsive to the action or the response, using a machine learning model and the EMG signal as input to the machine learning model to determine a feedback signal, and providing the feedback signal to the interactive system to cause the interactive system to take a new action or generate a new response in response to the feedback signal.

According to one aspect a method for training a model is provided. The method comprises receiving an output of a model, receiving an input signal from a speech input device wearable on a user, wherein the input signal is captured when the user is making a facial expression or gesture or speaking in response to the output, determining a feedback signal based on the input signal, and using the feedback signal at least in part to retrain the model. According to one embodiment, the input signal is at least one of a group comprising, an EMG signal, a microphone input signal, an inertial measurement unit, a camera, and a biosensor. According to one embodiment, the feedback signal indicates a frown and/or a head gesture. According to one embodiment, the model is a speech recognition model. According to one embodiment, the model is associated with a digital assistant. According to one embodiment, the method further comprises determining a dataset comprising a plurality of feedback signals including the feedback signal and retraining the model based on the dataset. According to one embodiment, the method further comprises converting the feedback signal to a scalar value. According to one embodiment, the method further comprises using the scalar value representing the feedback signal to retrain the model. According to one embodiment, the method further comprises training a reward model to predict the scalar value representing the feedback from the input and output of the knowledge system. According to one embodiment, the method used to at least in part retrain the model is based on reinforcement learning. According to one embodiment, the method further comprises determining content of words spoken by the user based on the feedback signal. According to one embodiment, the output of the model is provided at least in part by a knowledge system configured to interact with the user. According to one embodiment, the method further comprises receiving an input speech signal, converting the input speech signal to a text output, providing the text output to the knowledge system as a prompt, receiving, from the knowledge system, an output to the user, the output being generated by the knowledge system responsive to the provided prompt, and collecting a feedback signal from the user responsive to the output generated by the knowledge system. According to one embodiment, the knowledge system comprises a machine learning foundation model. According to one embodiment, the machine learning foundation model is retrained at least in part to be personalized to the user based on the user feedback. According to one embodiment, the machine learning foundation model is updated based on aggregated feedback signals collected across a plurality of users.

According to one aspect, a non-transitory computer-readable medium containing instruction that, when executed, cause at least one computer hardware processor to perform a method is provided. The method comprises acts of receiving an output of a model, receiving an input signal from a speech input device wearable on a user, wherein the input signal is captured when the user is making a facial expression or gesture or speaking in response to the output, determining a feedback signal based on the input signal, and using the feedback signal at least in part to retrain the model.

According to one embodiment, the input signal is at least one of a group comprising, an EMG signal, a microphone input signal, an inertial measurement unit, a camera, and a biosensor. According to one embodiment, the feedback signal indicates a frown and/or a head gesture. According to one embodiment, the model is a speech recognition model.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example" "various examples," "one example" "at least one example" "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed herein with reference to the accompanying figures, which are not intended to be drawn to scale. The figures are included to provide illustration and a further understanding of the various aspects and embodiments and are incorporated in and constitute a part of this specification but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
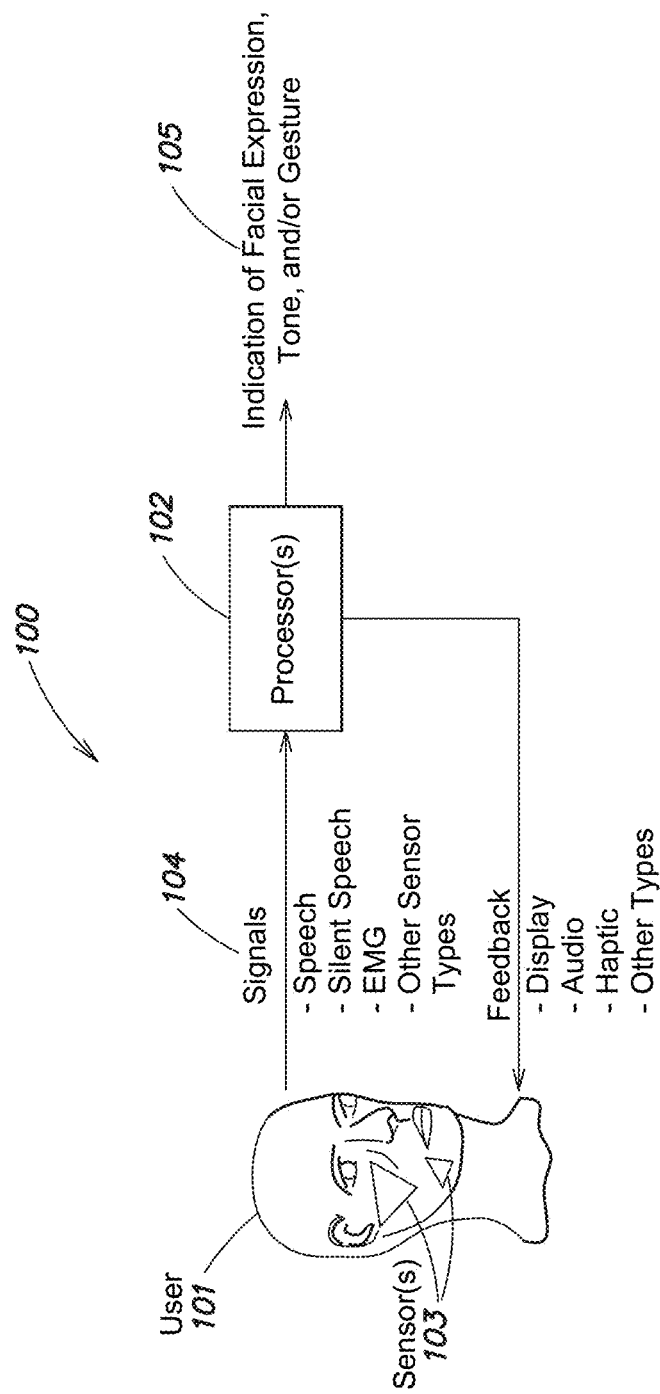
FIG. 1 is an example system in accordance with some embodiments of the technology described herein.

As discussed above, it may be helpful to detect and recognize user input such as silent speech, whispered speech, vocal speech, and other user input and use these signals to support new modalities that permit users to interact with computer-based systems more efficiently. Notably, various embodiments disclosed herein relate to detecting and processing gestures, expressions (e.g., facial), tone and/or gestures of the user can be used for the purpose of improving the quality and speed of interactions with computer-based systems. Such information may be detected by one or more sensors such as, for example, electromyography (EMG) sensors used to monitor and record electrical activity produced by muscles that are activated. Other sensor types may be used, such as optical, inertial measurement unit (IMU), or other types of bio-sensors. The system may use one or more sensors to detect speech alone or in combination with gestures, expressions (e.g., facial), tone and/or gestures of the user to provide input or control of the system.

The detected gestures, expressions (e.g., facial), tone and/or gestures of the user could be used with any application type, but it is appreciated that such information may be used to improve the quality and speed of interactions with an interactive system. For instance, interactive systems such as a digital assistant such as Alexa, Siri and others can use such information to respond and interact with a user in a more seamless way. Further, such information may be used as feedback to improve interactive models (e.g., statistical models, machine learning models, etc.) used to control the user interaction process.

The interactive systems may also provide feedback to the user in the form of information displayed to the user, audio played to the user in a headset or earbud, haptic outputs, etc. to more effectively communicate with the user during the interactive process. In one implementation, a device is provided that detects silent speech, whispered speech, or sub-vocalized speech. For instance, the inventors have recognized and appreciated that silent speech or sub-vocalized speech may be particularly useful in communication and may be implemented in in interactive systems. In these systems, for example, users may talk to the system via silent speech or whisper to the system in a low voice for the purposes for providing input to the system and/or controlling the system.

In at least some embodiments as discussed herein, silent speech is speech in which the speaker does not vocalize their words out loud, but instead mouths the words as if they were speaking with vocalization. These systems could enable users to enter a prompt by speech or communicate silently, but do not have the aforementioned drawbacks associated with voice-based systems.

In some embodiments as described herein, the device is improved by providing a capability of detecting, in addition to silent speech and sub-vocalized speech, the ability to detect gestures, expressions (e.g., facial), and/or tone of the user. Further, in some embodiments, the device and/or computer system is capable of using human feedback received from detected facial expressions, gestures, and/or tone to control errors in the device, as part of the product. Also, the detected facial expressions, gestures, and/or tone may be used by the device/system as feedback for training and improving the underlying models (e.g., machine learning models, statistical models, etc.).

In some embodiments described further below, some aspects described herein may be implemented with new technologies for interacting with mobile devices, smart devices, communication systems and interactive systems. In some embodiments, the techniques may include a (silent) speech model configured to convert an electrical signal generated from a speech input device to text, where the electrical signal may be indicative of a user's facial muscle movement when the user is speaking (e.g., silently or with voice). The speech input device may be a wearable device.

The techniques are also provided that include novel approaches in which a silent speech model may be trained and configured to convert an electrical signal indicative of a user's facial muscle movement when the user is speaking, such as EMG data, to text or other input type (e.g., control input). The silent speech model may be used to control an interactive system or to communicate with a system, device or other individual. In some embodiments, the techniques are provided that also use one or more additional sensors to capture other sensor data when the user is speaking, such as voice data. The other sensor data may be combined with the EMG data to improve the accuracy of the generated text.

FIG. 1 is an example system 100 in accordance with some embodiments of the technology described herein. As shown, system 100 may include one or more computer-based systems that are capable of interacting with a user (e.g., user 101). These computer-based systems may include one or more processors (e.g., processor(s) 102) that are configured to receive and process one or more signals (e.g., signals 104) to determine one or more indications of a facial expression, tone, and/or gesture (e.g., indication 105) produced by the user.

As discussed, a user 101 may produce one or more signals 104 such as speech, silent speech, EMG signals or other signals that are detectable by sensors, and these signals 104 provided to one or more processors 102 which in turn produce the indication 105. Indication 105 may be used by one or more systems for the purposes of indicating a facial expression, tone, and/or gesture of the user, and the indication may be usable in a number of situations in relation to application programs. To collect such signals from the user, there may be placed one or more sensors (e.g., sensor(s) 103) on or about the user 101. Such sensors, in some embodiments, may be provided within one or more wearable devices such as a headset, earbud, helmet or other type of wearable device.

In some embodiments, it is appreciated that feedback may be provided to the user in the form of displaying information, audio information, haptic feedback, or other types of information relating to the input signals 104. For instance, when the user interacts with a computer system using speech, the system may provide feedback to the user in relation to the speech or other input signal in one or more feedback forms such as display, audio or the like. In some embodiments, the system may be an interactive computer system that provides information to the user based on the input signals, and therefore operation of the system may be controlled by, at least in part, the input signals provided. Notably, processor(s) 102 determine whether user 101 is providing a facial expression, and expression of a tone, and/or is gesturing to the system, and such information determines data provided to the system or otherwise controls one or more processes performed by the system.

Figure 2:
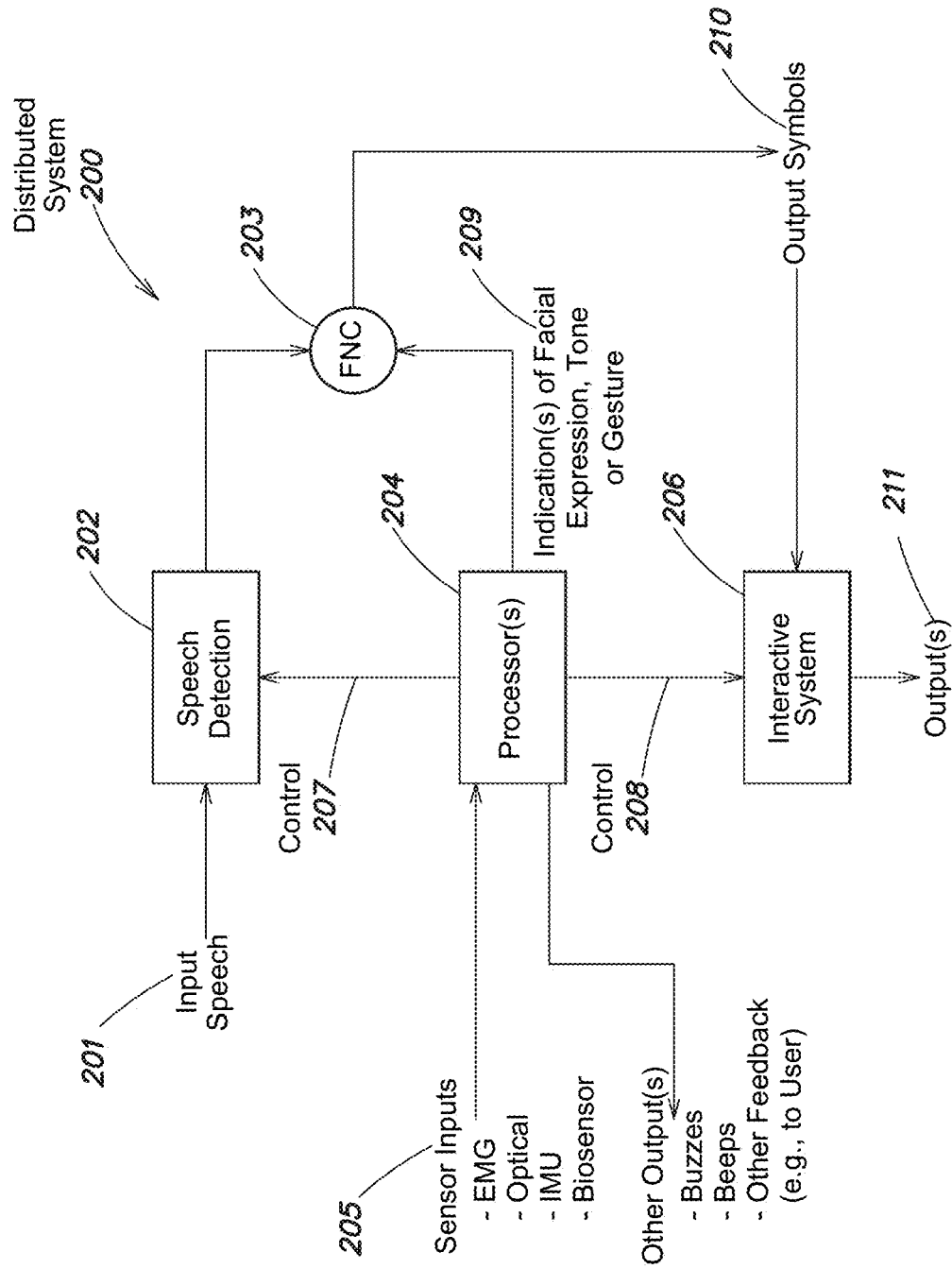
FIG. 2 shows another example system in accordance with some embodiments described herein.

FIG. 2 shows another example system in accordance with some embodiments described herein. In particular, FIG. 2 shows a distributed system 200 capable of performing processing of one or more inputs in relation to speech, facial expressions, tone and/or gestures performed by a user (e.g., user 101 of FIG. 1). In some embodiments, distributed system 200 includes a speech detection component 202 which is capable of processing input speech 201. Further, as discussed above with respect to FIG. 1, the system may include one or more processors (e.g., processor(s) 204) that are capable of processing one or more input signals. For example, sensor inputs may include EMG signals, optical signals, signals from an inertial measurement unit (IMU), a biosensor of any type, or other type of sensor. In some embodiments, processor 204 may provide one or more control signals 207 to control the speech detection component 202. For example, if a user indicates with an expression or gesture that the speech detection component 202 performed an incorrect operation, the detection of the expression or gesture may cause the speech detection component 202 to perform a different action or provided different result.

In some embodiments, processor 204 may provide as an output, one or more indications (indication(s) 209) of the user's facial expression, tone and/or gesture. Such an indication may be, for example, an absolute parameter such as yes/no, a Boolean value (e.g., smiling or not smiling) or any other parameter, degree, or data point that describes a facial expression, tone and/or gesture of the user. Further, the indication may include information such as a vector where each element of the vector corresponds to some degree of each facial expression across multiple facial expressions. The indication may also include a discrete prediction at different time points of what expression, if any, is being made. The indication may also include a time span of when a detected expression started and ended.

This indication information can be provided as outputs to one or more functions (function 203) that can combine or otherwise use the indication to control further outputs. In some embodiments, the indication of a facial expression, tone or gesture may be combined with a text output from a speech detection component to determine one or more output symbols 210. Such information may be sent to one or more systems, displayed to the user, or provided to one or more systems (e.g., interactive system 206). Such systems may then take the output symbols as a data input and provide one or more outputs (e.g., output(s) 211). For example, in one use case, the system may detect input speech, translate that speech to text, and indications of facial expression, tone and/or gesture may be translated to output symbols which are interleaved within the output text created by the speech detection component 202.

Processor 204 may provide one or more outputs to the user such as audio signals (pauses, beeps, etc.) or other types of feedback to the user. In one use case, the system may indicate to the user one or more translations of the facial expression, tone and/or gesture and provide an acknowledgment to the user that the system was not functioning as requested. In a specific example, the interactive system provides an output to the user, and the output was not the desired output, and the user makes expression on their face that is negative, and this information is processed and provided as feedback (e.g., a control signal 208) that directs the interactive system 206 to perform a modified operation or provide some other output.

Figure 3:
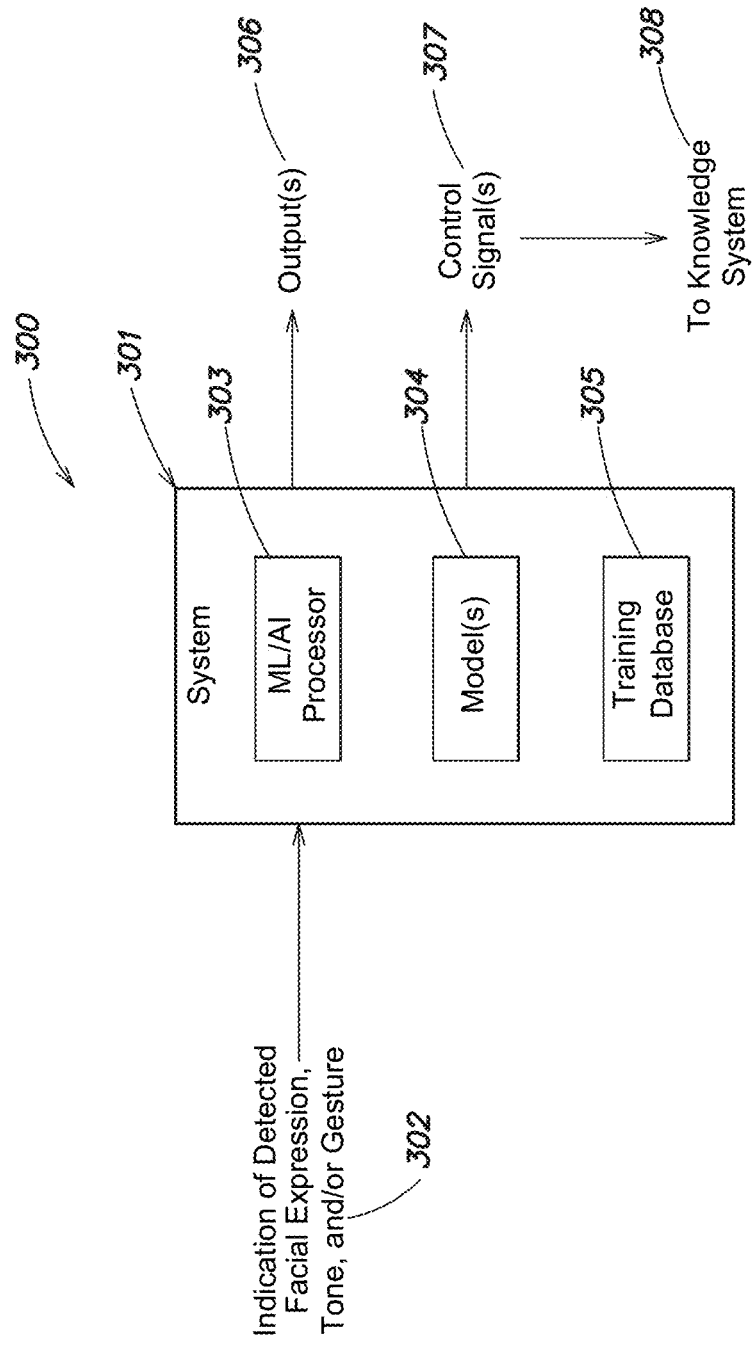
FIG. 3 shows a more detailed example system in accordance with some embodiments described herein.

FIG. 3 shows a more detailed example system in accordance with some embodiments described herein. In particular, FIG. 3 shows a distributed system 300 which includes one or more computer-based components. For example, system 300 may include one or more computer systems (e.g., system 301) that includes an ML/AI processor 303, one or more model(s) 304, and at least one training database 305. Embodiments, it is appreciated that an intelligent system such as a machine learning, artificial intelligence, statistical model, or other type of system be used to process signals indicating a detected facial expression, tone, and/or gesture (e.g., indication 302) for the purpose of providing one or more outputs (e.g., output(s) 306).

In some embodiments, the system may provide one or more control signals (control signal(s) 307) to one or more systems such as a knowledge system. For example, when example use case includes a knowledge system such as one that uses a large language model (LLM) for the purpose of providing information to a user. System 301 may interpret and use indications of a detected facial expression, tone, and/or gesture to control operation of the knowledge system (e.g., by providing one or more control signals to the knowledge system). In one example use case, a wearable device that detects facial expressions of the user may be used to control the operation of the knowledge system, such as indicating to the knowledge system that the knowledge system performed an incorrect operation and should provide an alternative response to the user.

Figure 4:
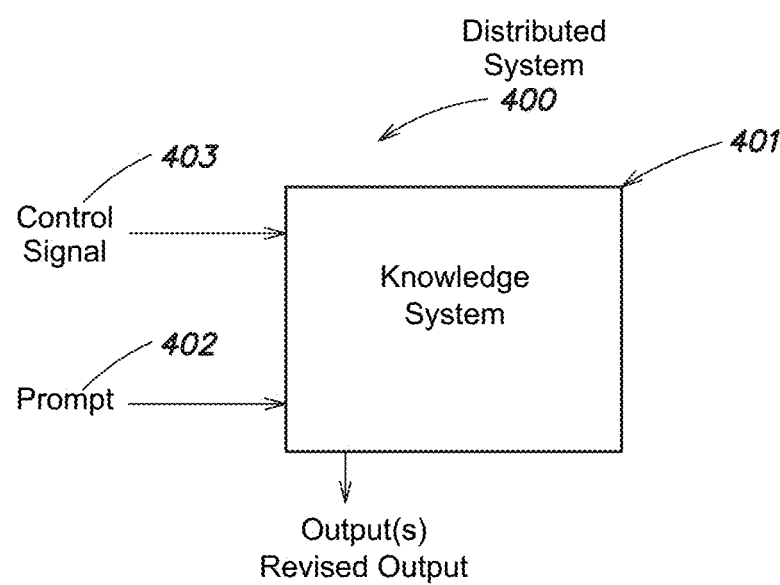
FIG. 4 shows an example use with a knowledge system in accordance with some embodiments described herein.

FIG. 4 shows an example use with a knowledge system in accordance with some embodiments described herein. In particular, FIG. 4 shows a knowledge system 40 one that receives one or more control signals (control signal 403) similar to the control signal 307 discussed above with reference to FIG. 3. Further, the knowledge system 401 may receive prompt information 402. In the case of an LLM, users provide text information in the form of prompts to receive some type of output. The text information may be, for example, a question or request submitted to the knowledge system, and responsive to that question or request, the knowledge system provides a suitable response.

One such type of LLM is the ChatGPT artificial intelligence chatbot provided by OpenAI. Other types of knowledge systems are available from various sources, and it should be appreciated that various embodiments discussed herein may be implemented in conjunction with such systems. In one embodiment, the control signal 403 detects some type of change within a facial expression, tone, and/or gesture of the user and is used to control the knowledge system to provide one or more outputs. In some cases, the outputs provided by the knowledge system may not be the desired output, and the control signal 403 may be used to determine an alternative prompt and/or a revised output of the knowledge system 401. In a practical example, the user may provide an initial prompt to the knowledge system and may be presented an output, and the users expression, town, and/or gesture may be used as feedback to control the knowledge system 401 to provide a revised output to the user. For example, the knowledge system may interpret the control signal 403 as a negative indication showing that the user wanted a different output, and therefore the knowledge system amends the prompt and/or provides a revised output based on the initial prompt or a revised prompt.

Figure 5:
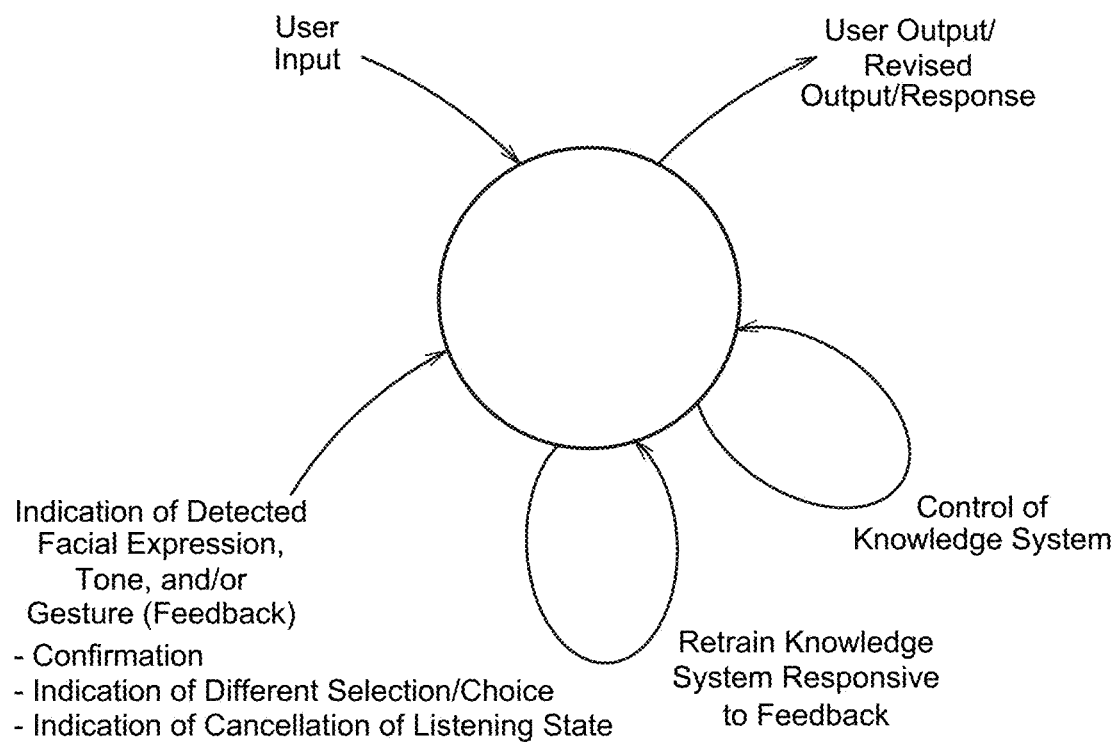
FIG. 5 shows an example state flow architecture that may be used in a system according to some embodiments described herein.

It should be appreciated that a wearable system that is capable of detecting a facial expression, tone, and/or gesture can be used to create content or inputs, control various functions, or be used in combination with other inputs to more effectively control one or more systems, including a knowledge system. FIG. 5 shows an example state flow architecture that may be used in a system according to some embodiments described herein.

As shown in FIG. 5, a system 500 receives a user input along with an indication of a detected facial expression, tone, and/or gesture. In some cases, the indication may be provided as part of feedback from a displayed user output. In such cases, the indication may be an indication of a confirmation, an indication of the different selection/choice (e.g., in the case of a menu selection), an indication of cancellation of a listening state of a knowledge system, personal assistant component (e.g., Siri) or other process. Notably, the system 500 uses the inputs and context of what output was provided to the user to determine the next action such as a revised output or response, control of the knowledge system or other application, and even a possible retraining of the knowledge system responsive to the feedback provided by the user in the form of a detected facial expression, tone, and/or gesture. In this way, operation of the knowledge system and/or any other type of application may be improved, as it is responsive to not only traditional user input but also other types of detected user signal.

Figure 6:
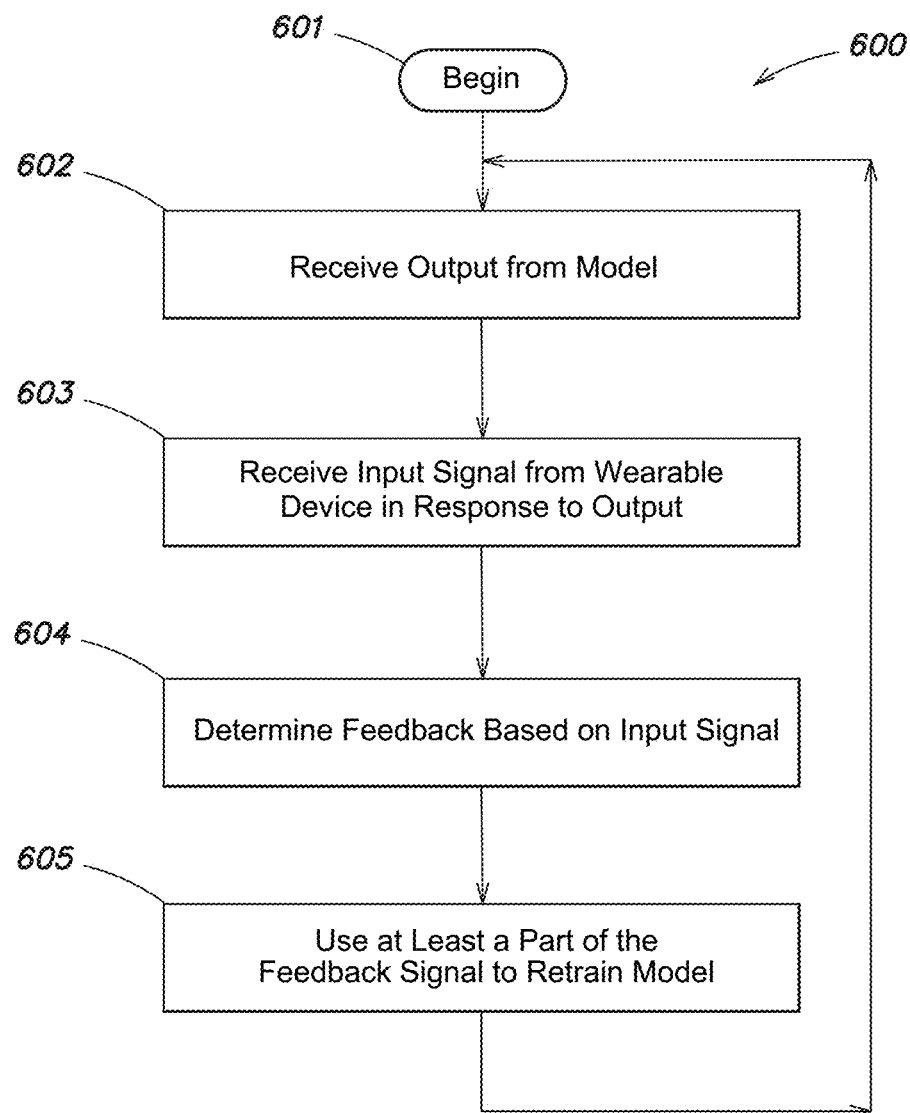
FIG. 6 shows an example method for processing input signals from a wearable system according to some embodiments described herein.

As discussed above, indications of a detected facial expression, tone, and/or gesture may be detected by a wearable device or system that is positioned on the head of the user. FIG. 6 shows an example method 600 for processing input signals from a wearable system according to some embodiments described herein. At block 601, process 600 begins. At block 602, the system receives an output of a model. For example, an LLM or other type of knowledge system may produce an output based on some previous input (e.g., a prompt).

At block 603, the system receives an input signal from a wearable device in response to the output (e.g., the output of the knowledge system displayed to the user). For example, user exhibits a facial gesture of a frown, shakes their head in a negative way, or provide some other negative that is detected by the wearable device. The system determines the user feedback based on the input signal received by the wearable device at block 604. At block 605, the system uses at least part of the feedback signal retrain the model. For example, the system may deemphasize a particular output in the future based on the feedback provided to the user. In some embodiments, steps 602-605 may be performed continuously as outputs are displayed in feedback received from the user.

Figure 7:
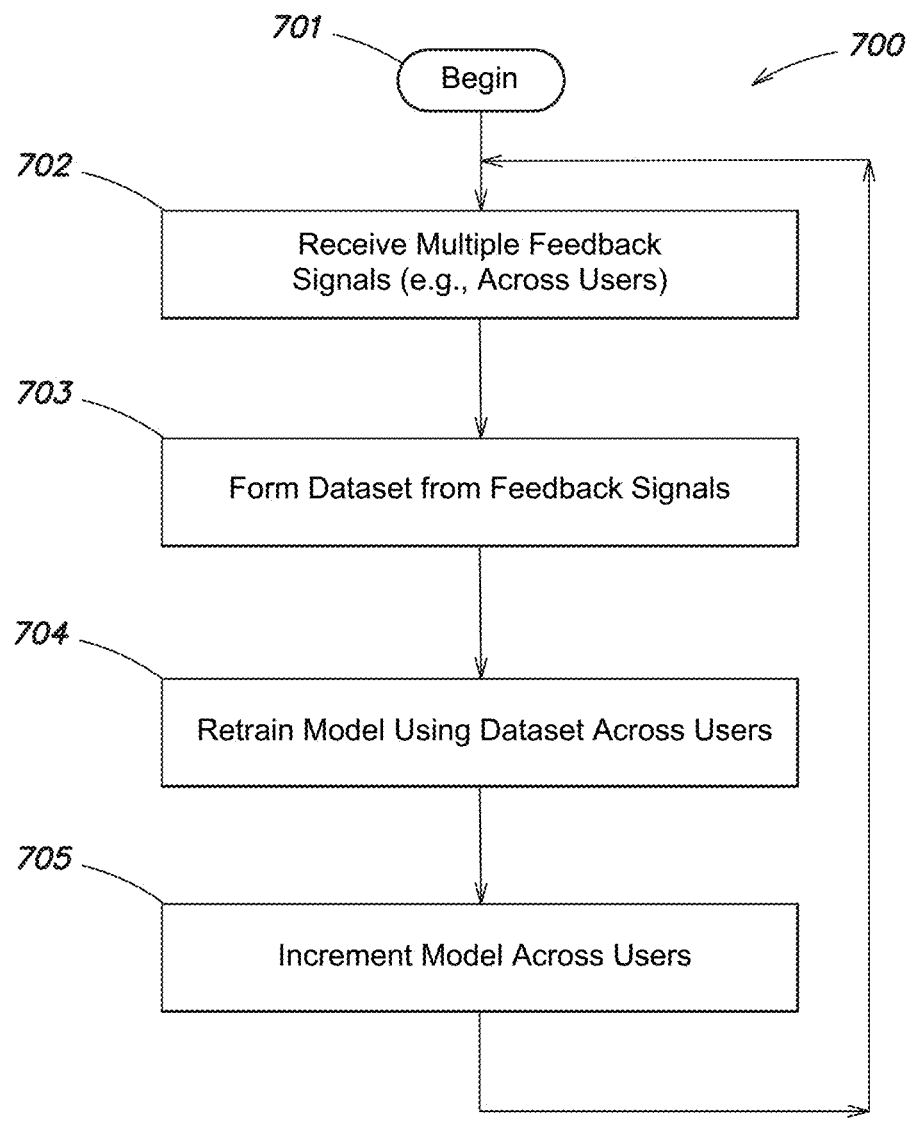
FIG. 7 shows an example method for improving a model across users according to some embodiments described herein.

As discussed above, it is appreciated that accuracy of the model may be increased as user feedback is provided from a number of different sources, such as multiple users. In some embodiments, models may be used across users and across user experiences. FIG. 7 shows an example method for improving a model across users according to some embodiments described herein. At block 701, process 700 begins. At block 702, the system receives multiple feedback signals, such as across multiple users. For instance, a common system accessible through a distributed network that is coupled to multiple wearable devices through one or more feedback channels can be used to collect feedback signals from a number of different users with the objective of improving the accuracy of intelligent models used to interpret signals and provide more exacting outputs. At block 703, the feedback signals may be periodically collected to format a data set of feedback signals.

At block 704, the system may retrain the model using the data set that was created by collecting feedback signals across users. Once retrain, the model may be distributed and/or implemented across users at block 705. Continuous collection and retraining of models may be performed by repeating steps 702-705.

Figure 8:
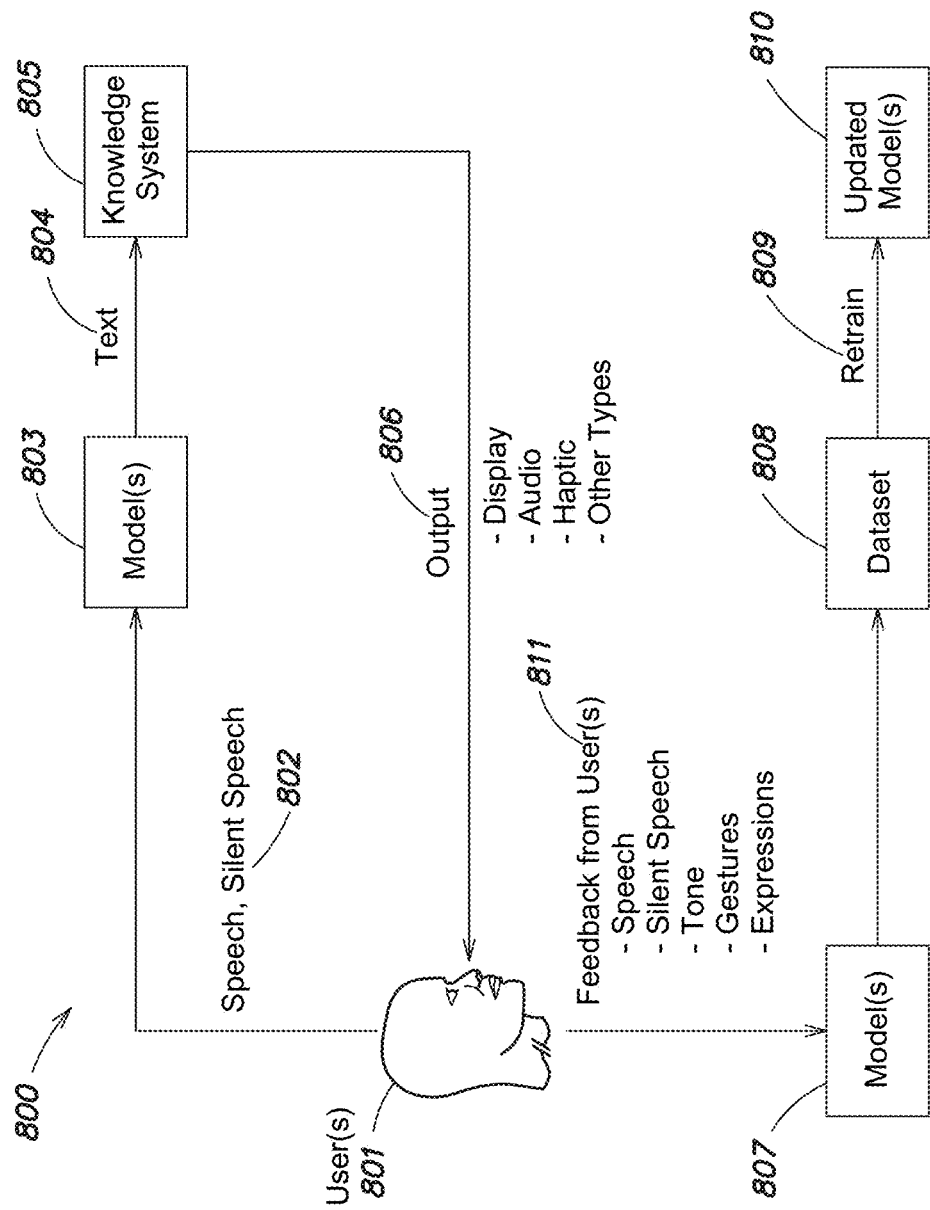
FIG. 8 shows an example implementation for processing feedback from a user according to some embodiments described herein.

As discussed, there are many different types of applications and systems that may benefit by collecting feedback from users in different forms such as speech, silent speech, tone, gestures and expressions, either alone or in combination with other types of signals. FIG. 8 shows an example implementation 800 for processing feedback from a user according to some embodiments described herein.

As shown, one or more user(s) 801 produce speech and/or silent speech signals 802 which are received by one or more models 803. Such models produce output text 804 which can be delivered to a knowledge system 805 or other type of system. Responsive to the input text (e.g., as provided by a prompt), the knowledge system 805 Pro produces an output to the user intersects. The output may be provided in the form of a display or other outputs such as audio outputs, haptic outputs, or other type of output can be received by the user.

Notably, users 801 received the output and provide some type of feedback 811. The feedback signals can be in the form of speech, sound speech, tone, gestures, or expressions in any combination. The output feedback may also be provided to one or more model(s) 801 which may include the same models were different models than those discussed above with reference to element 803. The feedback and/or outputs of the models may be stored within a data set 808 which can be used to retrain the model (e.g., any of the previous models) at 809 producing updated models 810. In some embodiments, it is appreciated that interactions with multiple users may be used to refine the actions produced by models in response to input user signals. Such models may be distributed and/or implemented across multiple interactive systems that are used with one or more users. Further, it is appreciated that there may be personalized models that are adjusted and/or configured specifically for a particular user.

As discussed, the user can provide both verbal and nonverbal signals that may be provided as feedback to a computer system. For example, verbal or nonverbal utterances may be provided as part of the feedback such as non-word verbal utterances like "ugh" or other types of grunts. Similarly, other utterances like "mhm" may be recognized by the system as a confirmation (e.g., selection of a previous choice or confirmation that the system responded as intended). For some verbal or nonverbal utterances, the system may employ a fixed mapping between such utterances and a positive/negative cue. Such feedback may be used to control the computer system, provide input data and/or improve any learning models that may benefit by feedback.

Of course, in some cases, fully expressed verbal utterances may be used as part of the feedback. For example, the person saying "that's right" or "no that's not what I meant" or "shut up" to turn off and interactive or listening session. This utterance could be parsed and matched against a keyword matching system (e.g., for positive/negative things), be processed by some NLP model, or may be processed directly by the knowledge system. In some embodiments, a tone of the user in response to the knowledge system output could also be used as part of that feedback. For example, if the follow-up is in an angry tone, this indication could be used as a negative feedback signal on the previous example. The system may be configured to detect tone via EMG sensors as well (alone or in combination with other sensor types).

The system may be configured to detect implicit feedback is many different ways. For instance, a user repeats the same prompt which implies the system got the response wrong the first time, so the system should try to re-generate a revised response. In another example, the user tries to rephrase the prompt using slightly different wording, indicating to the system that the first response was not what the user was looking for. In yet another example, if the user says anything in an irritated tone, this may indicate to the system that there is negative feedback.

The system may be configured to recognize other verbal/non-verbal gestures such as eye rolls. Eye rolls can be tracked via sensors of the wearable device (e.g., EMG sensors). In some embodiments, they might be configured slightly differently as electrooculogram (EOG) electrodes in terms of what signals they are measuring. In sum, many different verbal/non-verbal information represented by user response signals may be used to control interactions with a computer system.

Figure 9A:
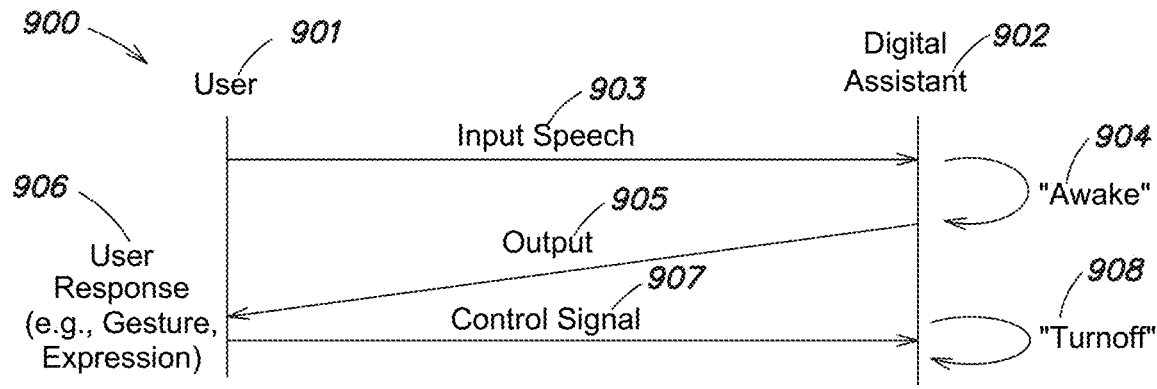
FIGS. 9A-C show some examples of use cases for processing user response signals according to some embodiments described herein.
Figure 9B:
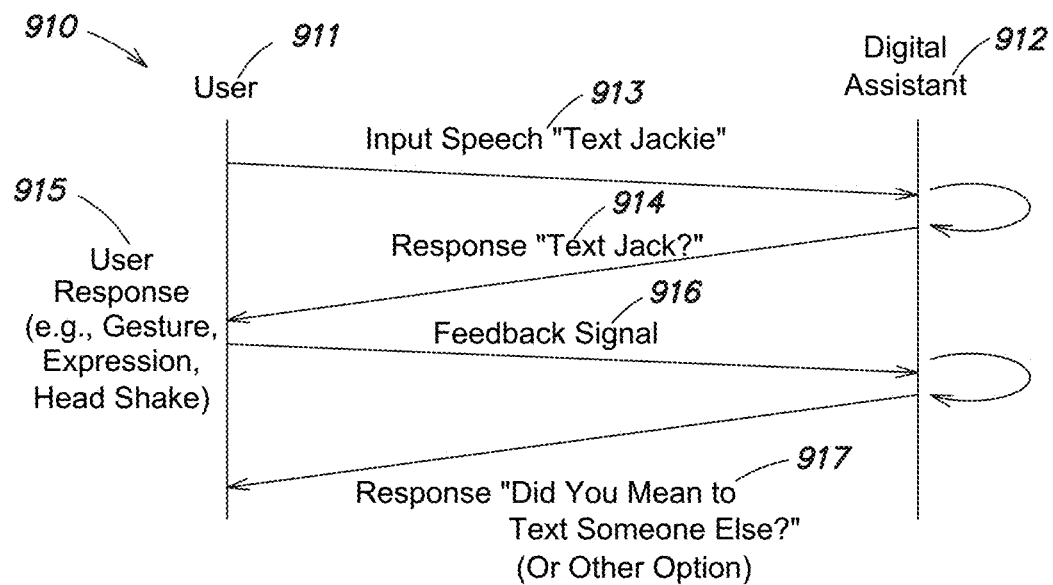
Figure 9C:
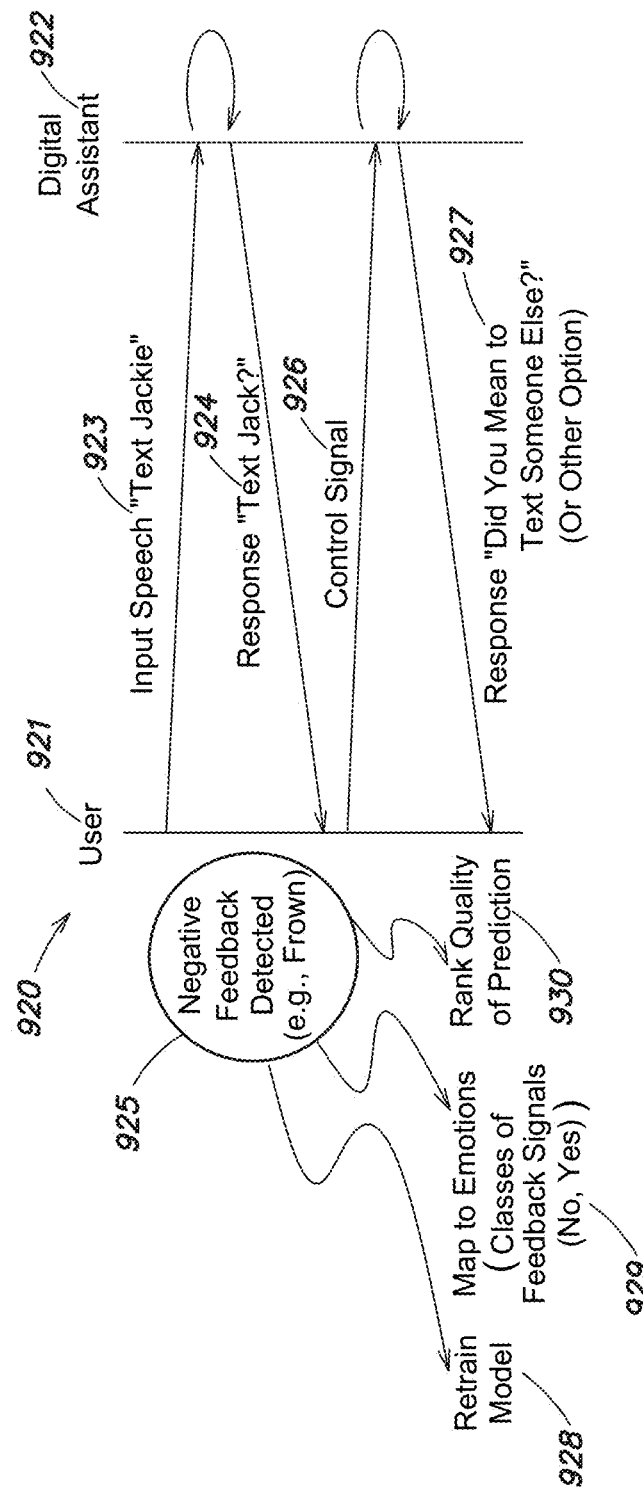

FIGS. 9A-C show some examples of use cases for processing user response signals according to some embodiments described herein. As discussed, these signals may include different types of gestures, expressions, etc. detected using one or more sensors (e.g., EMG, IMU, bio-sensors, etc.). These are used to respond to actions happening (e.g., a digital assistant, interface, application, etc.) and may also be used as feedback for improving models (e.g., ML/AI models, statistical models, etc.).

In one primary example as shown in FIG. 9A, detection of expressions and gestures are used to improve interactions with a digital assistant (e.g., digital assistant 902 such as Amazon Alexa) in real time. For example, instead of cursing at Alexa when the user does not want to use it, the system might either detect a small frown (e.g., a micro expression having a small time duration), and turn itself off, detect a head shake indicating disapproval, or some other negative feedback involving a detection of expression, gesture or tone. This would, from an immediate system perspective, mean that the system shuts itself off when it is improperly activated.

In FIG. 9A, user 901 provides input speech 9032 digital assistant 902. The digital assistant 902 turns on or is awake 904 and provides some output 905 to the user. At 906, the user responds via some gesture, expression, tone or other feedback which is provided as a control signal 907 to the digital assistant 902. Responsive to this control signal 907, the digital assistant 902 turns off at 908. In one example, the control signal 907 is a negative interpretation of the user response detected via one or more sensors (e.g., sensors detecting EMG signals). The interpretation of the gestures and expressions can be performed by a wearable device that works in concert with the digital assistant or some other type of system.

The concept could be extended to many different interactions with any number and type of system. For example, as shown in FIG. 9B, suppose the digital assistant 912 has been correctly activated, but the user (e.g., user 911) asks the digital assistant 912 to text Jackie using input speech 913 and the digital assistant responds at 914 asking if the user wants to "Text Jack?". With the user's facial expressions (e.g., a gesture, a head shake, etc.) detected and provided as feedback signal 916, the system could recognize the interpretation was wrong, and ask the user if they actually meant Jackie, or someone else (e.g., by indicating a response "Did you mean to text someone else?") or indicate some other option at 917. The user may provide any number and combination of responses which allows the system to correct itself quickly, in real time.

These updates could also be generated without expressions for feedback. For example, if the person tries the same command again, the system could recognize that the first time, the system did not perform the act the user wanted. Instead of doing the wrong thing again the digital assistant (e.g., Alexa, Siri, etc.) a model associated with the digital assistant (either in the assistant or separate from the assistant providing control signals to the assistant) could probabilistically generate a new output conditioned on the fact that the previous output was incorrect.

The types of signals used for this live product feedback could range also into micro-expressions, which in some embodiments can be brief, involuntary expressions people make when experiencing an emotion. The ability to detect such microexpressions is a unique capability of a system. In some embodiments, a micro-expression includes an expression that lasts <0.5 seconds, and typically between $1/25$s to $1/5$ of a second. In some embodiments, the capability of detecting neuromuscular signals, including the contraction of the muscles related to smiling or frowning even for just a millisecond can be used as feedback for controlling an ML/AI system.

In some implementations, detection of one or more micro-expressions may involve detecting activity that happens in the 5-500 ms range. In some specific implementations, sensors such as EMG and IMU sensors may be sampled at a high rate, e.g., up to 1 KHz, to be able to detect such micro-expressions. To train a model on such micro-expressions, this may be accomplished for example, by using higher speed cameras at, for example, 100 Hz. In some instances, the system might only train on frames that are sampled, i.e. use the data for the 40-100 ms surrounding the frame to predict the emotion in that frame to allow for detection of micro-expressions.

As shown in FIG. 9C, such feedback may be used to train one or more models. In particular, responsive to input speech "Text Jackie" 923 provided to the digital assistant 922, the digital assistant responds "Text Jack?" which then elicits negative feedback 925 which is detected by the system. For instance, if the user provides negative feedback like shaking their head or frowning, this signal could be a negative training signal for the model to recognize that it produced an incorrect transcription which can cause the system to generate another response (e.g., response "Did you mean to text someone else?" at 927). This could produce a training signal for improving the model. In the alternative, if the user smiles, this indication can be a reinforcing signal of a good prediction.

These updates could also be generated without expressions for feedback. If the user tries the same command again, the system can determine that the first time, the system did not do what the user wanted. This attempt at the same commend can act as a negative reinforcement signal.

Such feedback (either negative, positive or qualitative, etc.) can be used for a number of purposes. For instance, the system may use the feedback to retrain a model (e.g., at 928). Further, the feedback may be used to map the user feedback to one or more emotion states (e.g., happy, sad, positive, negative, yes/no, or other classification at 919). It should be appreciated that the system may be trained offline to recognize speech, sound speech, tone, gestures, or expressions in any combination. In some implementations, one or more models may be responsive to feedback from user speech, sound speech, tone, gestures, or expressions in any combination. Such signals may also be used to correct and/or update the model in real time, or during periodic updates. Such training could occur centrally, such via some service, and/or may be performed locally to a user's computer system(s).

As discussed, there are many example implementations in which a wearable device that provides feedback signals for training a model may be used. In one example system, a knowledge system provides a first response to the user (e.g., possible responding to a first prompt such as a text string extracted from a verbal/non-verbal input). The knowledge system generates a first response to the user. The user, responsive to the first response to the user, makes a gesture/expression that is detected by the wearable device. The knowledge system generates a second response based on the detected gesture/expression. The user may then make another gesture/expression, this time the latest expression is indicative of a preference of the first or the second response.

A reward model may be then trained to predict the preference of the first versus the second response and may be used in subsequent interactions. In one example implementation, the knowledge system could even ask the user directly: "was that better?" and the user could provide a speech-based response of preference (out loud, silently, whispered).

One main technique for using such signals to train the model is "reinforcement learning from human feedback" or RLHF. In some embodiments as described herein, it is appreciated that this RLHF approach can be used in this combination with a speech/silent speech device. The actual updates to the model could be personalized (per person, in a federated way on their device), or to a general model distributed to multiple users.

There are many other example implementations in which user response signals are processed according to some embodiments described herein. These signals may be received and processed in a variety of different instances and modalities. For example, in some embodiments, a physiology-defined approach may be implemented for recognizing certain emotions expressed by a user and those expressions may be translated and used by the system. For instance, it may be observed that a smile by a user involves the contraction of specific muscles, a frown other muscles, a strong jaw clench for anger, confusion different eye and facial muscle contraction, etc. Also, it may be observed that a head nod or shake involves a repeated motion and can be detected by an accelerometer (of left-to-right or up-and-down motions).

Therefore, in some implementations, the system may employ a rule-based and/or template matching system to determine whether particular signatures are observed by the EMG sensors and/or accelerometers (and/or other sensor type). If the signatures are observed, the system may indicate the presence of those emotions expressed by the user, and those indications can be used to form inputs, control processes, retrain models, or other functions within an interactive computer system.

In some embodiments, signals may be observed and the system may be configured to learn in a supervised way from these observed signals. For example, the system may learn across a network of users that utilize the systems/devices that detect user inputs through sensor activity. For example, the network may learn across a user base for the purpose of learning the possible different facial expressions, sentiments and/or gestures users could make. In some example implementations, the system may be configured to collect many examples across many people of different facial expressions or gestures they could make and provide labels for those different facial expressions or gestures. Further, the system may collect examples of users speaking while making a specific facial expression. Then, the system could train the network of distributed devices/systems used by various users to predict that expression or gesture from the labeled data.

In some implementations, the system may be configured to learn in a semi-supervised way. For instance, camera recordings of subjects may be collected while they are wearing the device (e.g., from an external camera or webcam-like setup). The system may be configured to use pre-trained models that can detect gestures or expressions from collected signals (e.g., videos) to identify the expression being made at each frame of the video (e.g., as detected from static frames). This collection serves as a labeled time series on a frame-by-frame basis. The label could be a discrete class label (e.g., one-shot), a probability distribution over different expressions/gestures/no-gesture, or a vector of different scores for each individual expression/gesture corresponding to multi-expression detection. In some implementations, the network could be trained to predict (e.g., per time point) this distribution of values for each expression.

In some implementations, the system may use signals (e.g., video) to train a model that operates substantially simultaneously with speech detection. For example, the system is configured to collect video data while the user is speaking (e.g., out loud and/or silently, in-line with the multi-domain speech recognition). Then, for each frame, the system may be configured to predict both the expression/gesture and the text corresponding to what was said by the user, or other arbitrary features (like prediction of the expression/gesture and the audio corresponding to what was said).

Certain signals may be used to train certain portions of a signal processing pipeline. For instance, the system may perform pre-training as part of the signal processing pipeline, i.e., masked modeling for self-supervised learning or pretraining style learning on EMG signals throughout the daily wear of the wearable, fine-tuned with any of the above features. Also, it should be appreciated that any of these above methods could be based on any sensor type including EMG, accelerometers, microphones, or any combination of sensors thereof.

In another embodiment, the gesture detection functionality could be activated at times when the system (e.g., the knowledge system or any other interactive system) is looking for gestural feedback. For example, the gesture detection functionality may be placed in an active mode when no speech is detected. In another embodiment, the gesture detection functionality could be activated immediately after speech is detected (so the speech recognition function can be shut off in the event of accidental activation). In another configuration, the gesture detection functionality could be activated after some feedback is presented to the user (i.e., feedback of the words that were recognized or the response/action of the knowledge system).

Other methods for updating a model (e.g., feedback used for training) may include supervised fine tuning on examples with positive feedback. If the user feedback is to say what they actually wanted the knowledge system response to be (e.g., as detected by the speech model), then the system could perform supervised fine tuning (also known as behavior cloning) based on the user inputs. Behavior cloning is a method by which human subcognitive skills can be captured and reproduced in a computer program. As the user performs the skill, their actions are recorded along with the situation that gave rise to the action. A log of these records is used as input to a learning program (e.g., a learning model).

Further, as discussed, the system may implement a variety of input/output modalities. In one implementation, the output/response of the knowledge system is shown on a visual display. In such an example, the system shows a possible response produced by the knowledge system. The user nods or shakes their head to confirm or reject the response; if the user rejects, the knowledge system samples another response, potentially using the context that the previous response(s) were incorrect. This continues until the knowledge system does the action that the user desires.

In sum, the gesture detection functionality may be implemented at various times and situations and may be used as an input in various ways depending on the context.

In some implementations, it is appreciated that there are several types of models that could be updated: the speech recognition model, or an intent parsing model that turns what is recognized into a command, a separate control model, a sentiment scoring model, or other type of model or functionality that is capable of translating signals from sensors to various indications, control signals and inputs. In some embodiments, one or more of these functions may be capable of detecting expressions in isolation, generating labels for data, detecting emotions, making decisions regarding input signals (e.g., determining when to use an input signal as an input, a feedback signal, etc.), creating representations of the detected emotions or expressions, or performing a number of data handling or other functions in response to the input signals.

In some embodiments, detection of expressions (including, for example, microexpressions) may be performed by one or models in isolation. For instance, there may be specialized models trained on various input signals from different sensor types that provide indications of certain expressions. For instance, various expressions or emotions such as happiness, anger, or any other indication of positive/negative feedback (e.g., responsive to some stimuli and/or presentation of information by a computer system). These indications may be used to label data, provide some indication within an interface, retrain a model and/or control some interactive process (e.g., a knowledge system).

The system may also determine such indications in real time, such as when a person is speaking. In such a case, the system may generate a prediction of the expression (or microexpression) being made while the person is speaking or generating silent or whispered speech. In some cases, the system may be configured to generate a representation of the user based upon the facial expression (e.g., by generating an avatar representation, a smile indication, frown indication, emojis, etc. within output text, in the interface, etc.). The detection may work along with a processor for detecting input speech or may be combined within a single entity. In some implementations, the expression detection may be performed in parallel with a detection of input speech, such as a case where a user is providing a speech input and the detection of the expression, emotion, etc. provides some information about the input speech. One example include a lie detection function which can be used by the system to annotate the parallel input speech (e.g., the last phrase was indicated as being a probable lic).

In some cases, the system may be configured to generate labels for data such as a camera stream where the system provides at least partial annotations for the labels. In some instances, humans may also provide label information (e.g., during some post-processing function, as a prerequisite for training or improving a model, etc.). As discussed, the system may also process input speech in parallel, and therefore may label the input speech. The system may also accept and/or may be trained by labels generated by humans and/or may provide assistance to human labelers while the input signals are being labeled (e.g., provide one or more predictions of a label to a human labeler).

In some cases, an input signal provided by a user might be a feedback signal intended to correct some previous interpretation by the system. For example, in the case of the user providing a negative feedback such as a frown or shaking of the head, the system may be configured to distinguish between a feedback signal and a normal input mode. In some cases, the system may be configured to determine when a signal is feedback versus some other input. This capability may be configured through training, rule-based, and/or mapping on how the system may respond when a certain input is received. In some instances, certain signals and/or combinations of signals may be trained for or configured to perform a certain system response. In some cases, the system may maintain a mapping of certain emotions/expressions determined to be feedback to indicate to the system how well or poorly the system performed with respect to a particular function. The system may also be capable of classifying and detecting a level of feedback (e.g., a severity to the yes (positive) or no (negative) signals (i.e., did the system perform really well or really badly)).

In some embodiments, the system may be configured to map emotions/expressions to scalar value reward signals. In some implementations, a ranking model may be implemented where a reward function is trained on the preference between two generations of a language model that leads to two different transcripts. In some examples, different expressions may have mappings to positive/negative signals. In a similar manner, different gestures may have such mappings.

Some examples of recognized gestures may include tap on check, double tap on check, teeth click, jaw clench, head shake, head nod, touching a capacitive sensor, swiping the face, eye blink, doing any of the above actions more than once, pursing lips, head tilt, or other gesture or combination of gestures.

In sum, the models may provide any number and type of functions based on the input gestures, expressions and tone detected from the user (e.g., via the wearable device).

Example Implementations

As discussed above, various aspect may be implemented within a speech device that recognizes user speech. As further shown in FIGS. 10A-19, various configurations of a speech input device and/or speech model installed therein are described in which various embodiments may be practiced. Details of the speech model and training thereof for silent speech are also described.

Figure 10A:
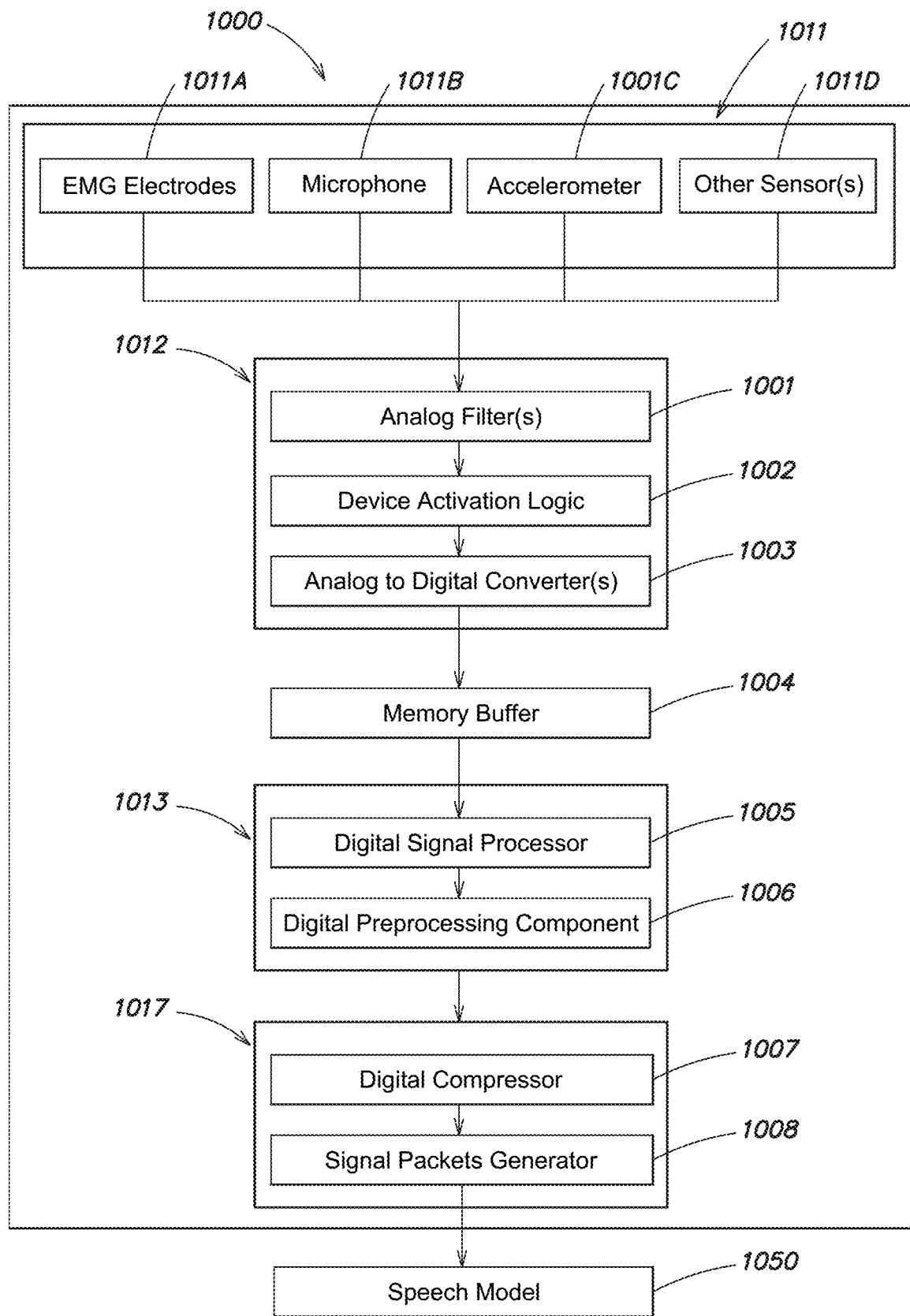
FIG. 10A is a scheme diagram of an example speech input device capable of communicating with a speech model external to the speech input device, in accordance with some embodiments of the technology described herein.

FIG. 10A is a schematic diagram of an example speech input device 1000 capable of communicating with a speech model 1050 external to the speech input device, in accordance with some embodiments of the technology described herein. In some embodiments, the speech input device 1000 may be included in the user interaction system (e.g., system 100 of FIG. 1). For example, the speech input device 100 may be an example configuration of a speech detection device 202 (FIG. 2). In some embodiments as shown in FIG. 10A, the speech input device 1000 may include one or more sensors 1011, which record signals indicating a user's speech muscle activation patterns associated with the user speaking (e.g., in a silent, voiced, or whispered speech). In non-limiting examples, the one or more sensors 1011 may include one or more EMG electrodes 1011A, a microphone 1011B, an accelerometer 1011C and/or other suitable sensors 1011D. The signals collected from the sensors may be analog signals which are provided to the signal processing unit of the speech input device.

In some embodiments, the speech input device 1000 may include a signal processing unit 1012, one or more processors 1013, and a communication interface 1017. The signal processing unit 1012 may include one or more analog filters 1001, a device activation logic 1002, and one or more analog-to-digital converters 1003. The analog filters 1001 may be used to improve the quality of the signals for later processing. For example, the analog filters 1001 may include a high-pass filter, a low-pass filter, a bandpass filter, a moving average filter, a band stop filter, a Butterworth filter, an elliptic filter, a Bessel filter, a comb filter, and a gaussian filter, or a combination thereof. It is appreciated that the analog filters many include other suitable filters. The analog filters 1001 may be implemented as a circuitry within the speech input device 1000.

The device activation logic 1002 may analyze the filtered signals provided from the analog filter(s) 1001 to determine the presence of one or more activation signals recognized from the analog signals. For example, a user may say a particular word or phrase out loud, which is recorded by the microphone. The device activation logic 1002 may recognize this word or phrase and in response will perform one or more actions. The one or more actions may include changing a mode of the device, activating one or more features of the device, and performing one or more actions. The device activation logic 1002 may analyze analog filtered signals as shown, unfiltered analog signals, digital signals, filtered digital signals and/or any other signal recorded from the one or more sensors. The device activation 1002 logic may operate on signals from any of the sensors, e.g., the EMG electrodes 1011A, the microphone 1011B, the accelerometer 1011C, and any other sensors 1011D in the speech input device 1000. Although the device activation logic 1002 is shown to be implemented in signal processing unit 1012, it is appreciated that the device activation logic 1002 may be implemented in any suitable component of the speech input device 1000, e.g., one or more processors 1013.

In some embodiments, digital converters 1003 may convert analog signals to digital signals. The signals input to the analog-to-digital converters may be filtered or unfiltered signals. For example, analog signals from the one or more sensors (e.g., 1011) may be directly passed to one or more analog-to-digital converters 1003 without the analog filters 1001. In some embodiments, there may be a respective individual analog-to-digital converter for each sensor (e.g., any of 1011). The one or more analog-to-digital converters 1003 may be implemented as circuitry within the speech input device 1000, e.g., a chip or application specific integrated circuit (ASIC). Any suitable analog-to-digital converter circuit configuration may be used.

In some embodiments, the one or more processors 1013 may perform a series of processes on the signals received from the sensors. As shown, the one or more processors 1013 may process signals from the one or more sensors 1011, or via the signal processing unit 1012. Additionally, and/or alternatively, the speech input device 1000 may include one or more memory buffers 1004. The memory buffers 1004 may temporarily store data as it is transferred between the signal processing unit 1012 and one or more processors 1013, or between any other internal units of the one or more processors 1013, or between any components of the speech input device 1000. The memory buffers 1004 may be implemented as hardware modules or may be implemented as software programs which store the data in a particular location within a memory of the speech input device 1000. The memory buffers 1004 may store data including analog and/or digital signals, such as filtered signals from analog filter(s) 1001, digital signals from analog-to-digital converter(s) 1003, control signals from the device activation logic 1002, and any other data from within the speech input device 1000.

In some embodiments, the one or more processors 1013 may include a digital signal processor 1005 configured to perform digital signal processing on digital signals from the analog-to-digital converter(s) 1003, for example, or digital data stored in the memory buffer 1004. In some embodiments, digital signal processor 1005 may process the digital signals and improve the quality thereof for later processes. In some embodiments, the digital signals may undergo one or more digital processing operations in the digital signal processor 1005. In some embodiments, the digital processing in the digital signal processor 1005 may be tailored to specific signals, e.g., signals from the EMG electrodes 1011A, which may undergo specific digital processing that is different from processing executed on signals recorded from the microphone 1011B. Examples of digital signal processing performed in the digital signal processor 1005 include digital filtering of the signals, feature extraction, Fourier analysis of signals, Z-plane analysis, and/or any other suitable digital processing techniques.

In some examples, the digital signal processor 1005 may include one or more layers of a neural network and/or a machine learning model maintained by the speech input device to generate digital signal vector(s). Additionally, and/or alternatively, the one or more processors 1013 may include a digital preprocessing component 1006 configured to perform one or more preprocessing operations, e.g., normalization of data, cropping of data, sizing of data, reshaping of data, and/or other suitable preprocessing actions.

In some embodiments, the communication interface 1017 may be configured to receive signals from other units, e.g., 1011, 1012, 1013, and prepare data for further processing. In some embodiments, the communication interface 1017 may include a digital compressor 1007 configured to compress the received signals and a signal packets generator 1008 configured to perform signal packaging for transmission. In some embodiments, the signals received at the communication interface 1017 may undergo digital compression at the digital compressor 1007 and the compressed data from digital compressor 1007 may be packaged for transmission. In non-limiting examples, digital compression may be performed at digital compressor 1007 on one or more signals in order to reduce the amount of data transmitted by the speech input device. Digital compression performed at digital compressor 1007 may use any suitable techniques, e.g., lossy and lossless compression techniques.

In some embodiments, signal packaging may be performed at signal packets generator 1008 to format (e.g., packetize) data for transmission according to a particular transmission modality. For example, a signal may be packetized with additional information to form a complete Bluetooth packet for transmission to an external Bluetooth device. In the example shown in FIG. 10A, the packetized signal may be sent to an external device having a speech model 1050 for converting to text, for example.

Figure 10B:
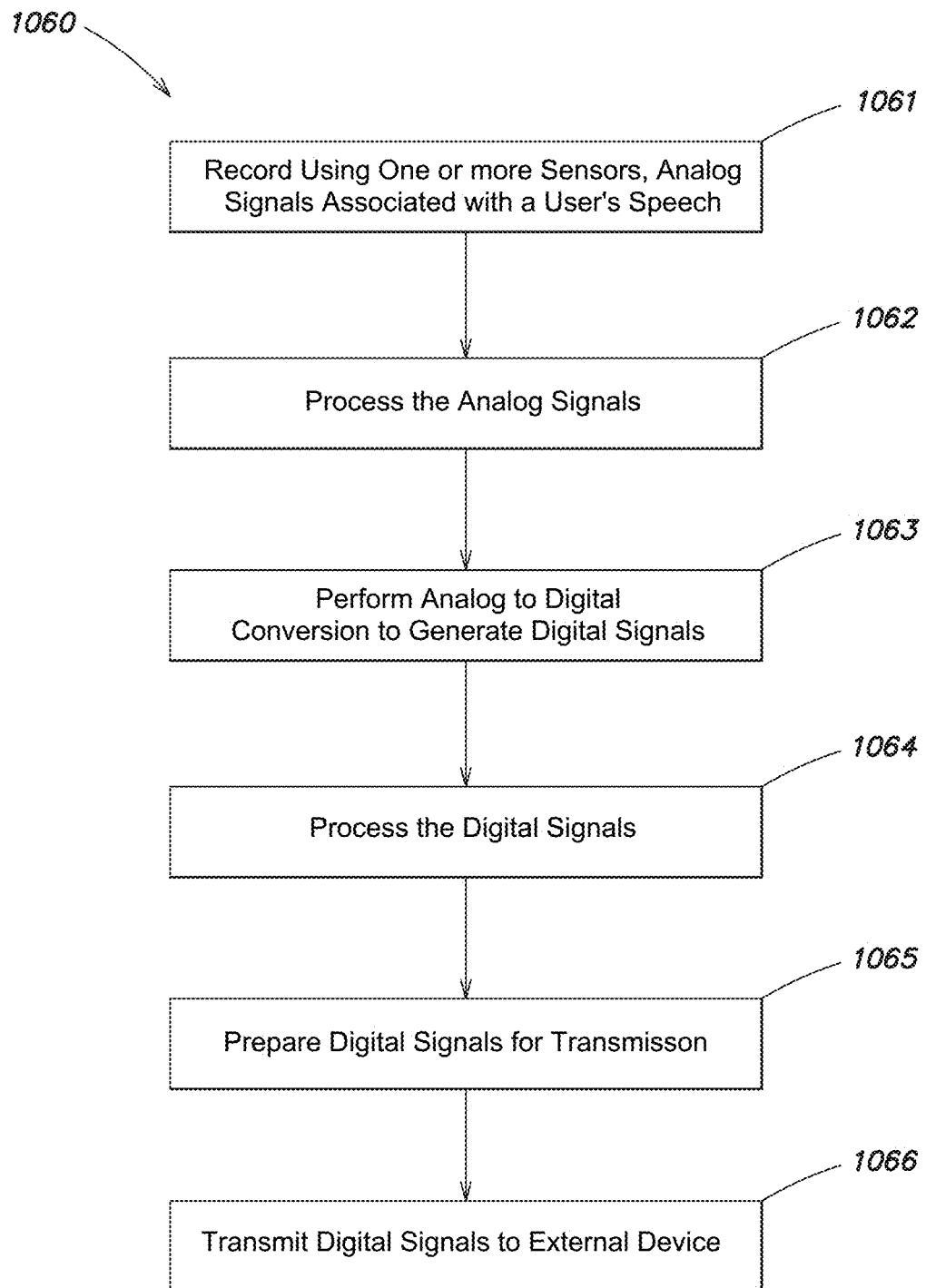
FIG. 10B is a flow diagram of an example process which may be performed by a speech input device, in accordance with some embodiments of the technology described herein.

FIG. 10B is a flow diagram of an example process 1060 which may be performed by a speech input device such as speech input device 1000 shown in FIG. 10A, in accordance with some embodiments of the technology described herein. In some embodiments, process 1060 may be performed by one or more components in the speech input device 1000 (FIG. 10A) to capture sensor data when the user is speaking and process the sensor data before transmitting to an external device. In some embodiments, method 1060 may start with capturing, at one or more sensors (e.g., 1011 in FIG. 10A), speech signals from a user associated with the user's speech, at act 1061. In some embodiments, the speech signals captured from the sensors may be analog signals. Method 1060 may further include processing the captured analog signals at act 1062. In some examples, act 1062 may be performed at signal processing unit 1012 (FIG. 10A) and may include various processing operations, e.g., filtering, feature extraction, device activation, and machine learning processing, among other techniques as described above and further herein.

With further reference to FIG. 10B, method 1060 may include performing analog-to-digital conversion to generate digital signals, at act 1063. In some examples, act 1063 may be performed at analog-to-digital converter(s) (e.g., 1003 in FIG. 10A). Method 1060 may further include processing the digital signals, at act 1064. For example, act 1064 may be performed at digital signal processor 1005, and optionally, digital preprocessing component 1006 (FIG. 10A). For example, act 1064 may include digital filtering of the signals, feature extraction, Fourier analysis of signals, machine learning processing and Z-plane analysis, among other processing techniques as described above and further herein.

With further reference to FIG. 10B, method 1060 may further include preparing digital signals for transmission, at act 1065. In some embodiments, act 1065 may be performed at communication interface 1017 (FIG. 10A). For example, act 1065 may include preprocessing signals, compressing signals and packetizing data as discussed above and further herein. Method 1060 may also include transmitting the signals from act 1065 to an external device, at act 1066. The signals may be transmitted using any suitable protocol, as discussed herein.

In some embodiments, the signals transmitted from the speech input device 1000 to the external device (e.g., 1050 in FIG. 10A) may include sensor data associated with a user's speech (e.g., silent speech), or the processed sensor data. The external device may include a speech model configured to convert the sensor data (or processed sensor data) to text or encoded features for use with any suitable system, where the encoded features may include information about the uncertainty of the text. Thus, the combination of the speech input device and the external device enables a wide range of systems and applications that can utilize the speech model. In non-limiting examples, the external device may be a computer, a laptop, or a mobile phone that includes a speech model, and is capable of communicating with speech input device (e.g., 1000) to receive the sensor data associated with a user's speech, where the speech model is also configured to convert the sensor data to text or encoded features. The computer, laptop, or the mobile phone may implement any application to take one or more actions. For example, the computer, laptop, or the mobile phone may implement a user interaction system, such as system 100 shown in FIG. 1, which receives text prompt or encoded features from the speech model to take one or more actions. The user interaction system may be implemented in the computer to interact with a knowledge system by providing the received text prompt or encoded features from the speech model to the knowledge system and cause the knowledge system to take the one or more actions. It is appreciated that any other suitable systems may be enabled by the speech input device.

It is appreciated that the various processes as discussed with acts in method 1060 may not be all performed or may be performed in any suitable combination or order. Each signal as captured at the one or more sensors (e.g., 1011) may have associated processing operations that may be tailored to that particular signal. Different types of signals may be processed in a series of respective different operations. For example, signals from the EMG electrodes may undergo all operations in method 1060 whereas signals from the microphone may only undergo analog to digital conversion at act 1063 and digital processing at act 1064. In some embodiments, the processing performed at each of the processing operations of in a series of processing operations in method 1060 may also be different for each signal received from the sensor(s). For example, analog filters used by act 1062 may include a high-pass filter for signals received from the microphone and include a bandpass filter for signals received from the EMG electrodes.

Figure 11A:
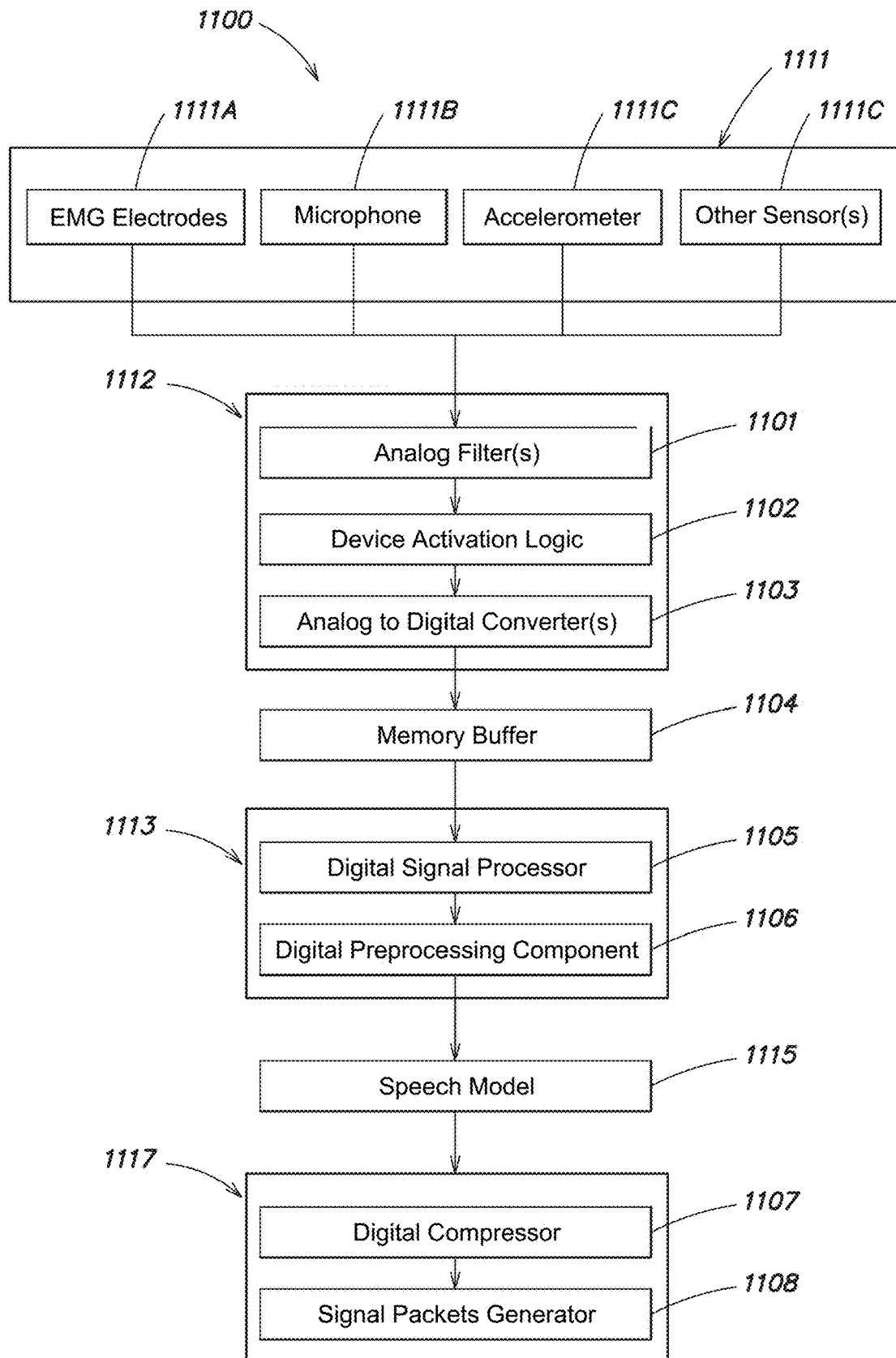
FIG. 11A is a scheme diagram of an example speech input device including a silent speech model, in accordance with some embodiments of the technology described herein.

FIG. 11A is a scheme diagram of an example speech input device 1100 including a silent speech model, in accordance with some embodiments of the technology described herein. In some embodiments, speech input device 1100 may have a similar configuration as speech input device 1000 (FIG. 10A) with a difference being that speech input device 1100 in FIG. 11A includes an embedded speech model 1115, rather than the speech model being external to the speech input device as in FIG. 10A. Thus, the numerals 1000's in FIG. 10A and numerals 1100's in FIG. 11A may correspond to similar components when the last two digits are the same. For example, 1111 in FIG. 11A may correspond to one or more sensors 1011 in FIG. 10A for capturing electrical signals indicating the user's speech muscle activation patterns or other measurements when the user is speaking (e.g., in a voiced, silent, or whisper speech). Similarly, 1112 in FIG. 11A may correspond to signal processing unit 1012 in FIG. 10A.

As shown in FIG. 11A, speech input device 1100 may additionally include a speech model 1115 configured to covert the digital signals from one or more processors 1113 to text or encoded features. The speech model and the training thereof will be further described in embodiments in FIGS. 15-19. With further reference to FIG. 11A, speech model 1115 may provide the text or encoded features to the communication interface 1117 for transmitting to an external device. In some embodiments, the communication interface 1117 may transmit the compressed/packetized text or encoded features to an application on the external device via a communication link such as a wired connection or a wireless connection.

Figure 11B:
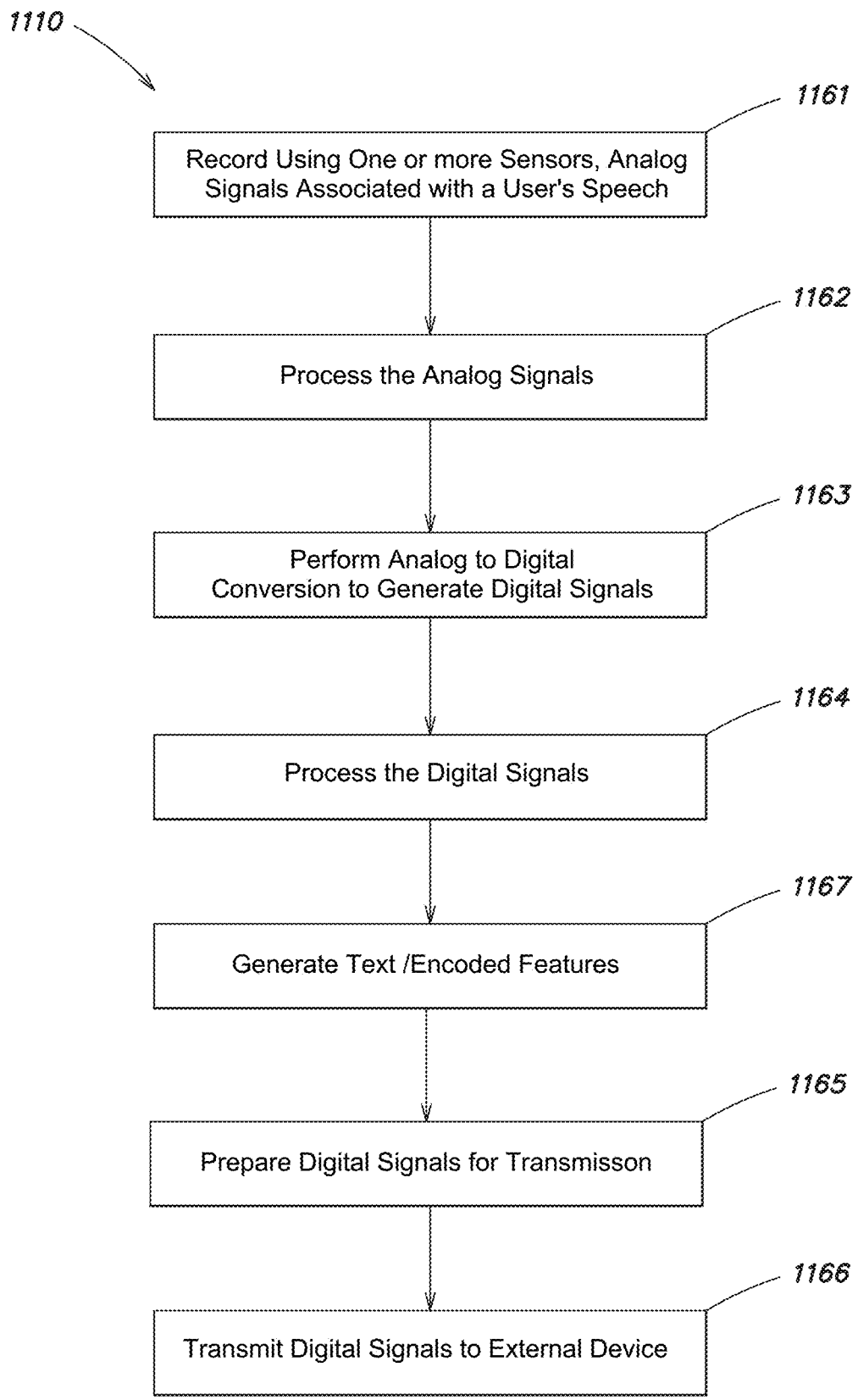
FIG. 11B is a flow diagram of an example process including the use of a silent speech model, where the process may be performed by a speech input device, in accordance with some embodiments of the technology described herein.

FIG. 11B is a flow diagram of an example process 1160 including the use of a silent speech model, where the process may be performed by a speech input device, e.g., 1100 (FIG. 11A) in accordance with some embodiments of the technology described herein. Various acts in process 1160 may correspond to acts with the numerals alike in process 1060 in FIG. 10B. For example, method 1160 may be similar to method 1060 (FIG. 10B), with a difference being that method 1160 may generate text or encoded features at act 1167, where act 1167 may be performed using a speech model (e.g., 1115 in FIG. 11A). Subsequent to generating the text or encoded features, method 1160 may prepare the output of the speech model (e.g., compressing, packetizing) at act 1165, and transmit the output to the external device, at act 1166.

As similar to FIGS. 10A and 10B, speech input device 1100 (FIG. 11A), with the combination of an external device may enable a wide range of systems and applications in a similar manner as with speech input device 1000 (FIG. 10A). In non-limiting examples, the external device may be a computer, a laptop, or a mobile phone that is capable of communicating with speech input device (e.g., 1100) to receive text or encoded features associated with the user's speech, where the text prompt or encoded features are generated by the speech model in the speech input device, using the sensor data captured at the speech input device. The external device may use the received text or encoded features to enable any application. For example, the application may be as interaction system, e.g., system 100 (FIG. 1), which receives the text prompt or encoded features from the speech model and provide the text prompt or encoded features to a knowledge system to take one or more actions.

Figure 12A:
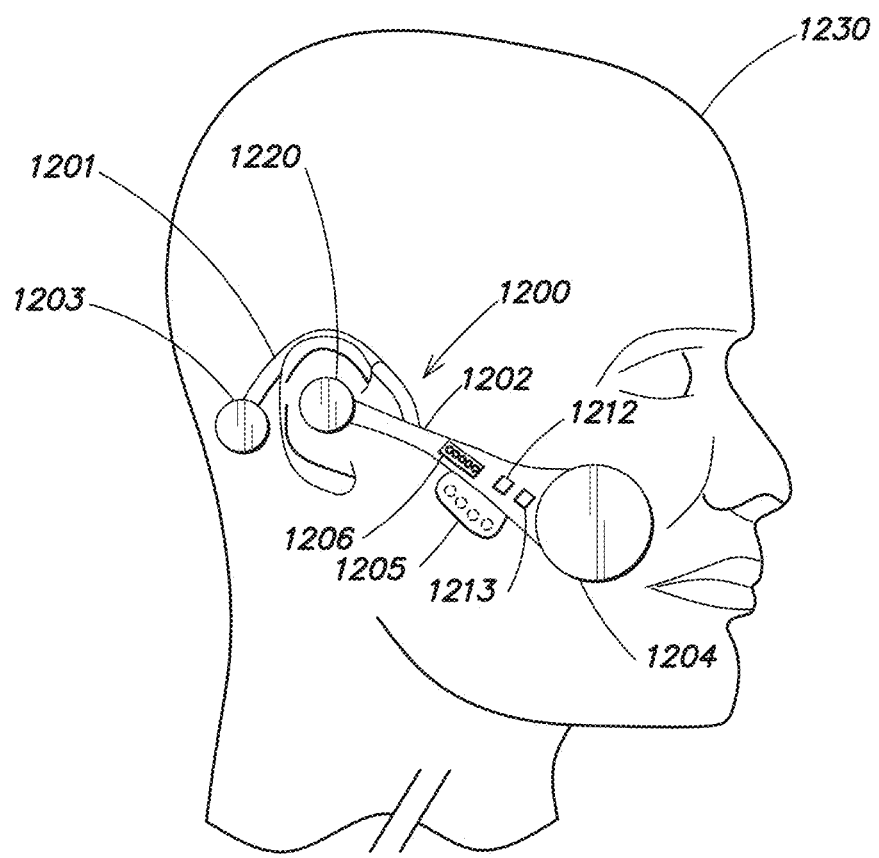
FIG. 12A is a perspective view of a wearable speech input device having an ear hook embodiment and wearable on a user's ear, in accordance with some embodiments of the technology described herein.

FIG. 12A is a perspective view of a wearable speech input device 1200 having an car hook embodiment and wearable on a user's car, in accordance with some embodiments of the technology described herein. The wearable speech input device 1200 may be an example implementation of the speech input device, e.g., 1000 (FIG. 10A), 1100 (FIG. 11A) as described in embodiments in FIGS. 10A-11B. In some embodiments, the wearable device 1200 may include an car hook portion 1201 configured to fit around the top of a user's car. The car hook 1201 may support a sensor arm 1202 of the wearable device 1200 and a reference electrode 1203 of the device. The car hook 1201 may be adjustable to conform to the anatomy of a user 1230. The wearable device 1200 may additionally include one or more inputs 1206 (e.g., buttons) accessible to the user 1230 while the wearable device 1200 is being worn.

With further reference to FIG. 12A, the wearable device 1200 may include a sensor arm 1202, supported by the car hook 1201. The sensor arm 1202 may contain one or more sensors 1205 for capturing speech signals indicating a user's speech muscle activation patterns or other measurements from the user 1230 when the user is speaking. The one or more sensors 1205 may include any of the sensors 1011 (FIG. 10A) or 1111 (FIG. 11A) or any other suitable sensors. In some embodiments, the one or more sensors supported by the sensor arm may include EMG electrodes 1204 configured to detect EMG signals associated with the user speaking. The EMG electrodes 1204 may be configured as an electrode array or multiple electrode arrays supported by the sensor arm 1202 of the wearable device 1200. Although the EMG electrodes 1204 are shown to be positioned at a distal end of the sensor arm 1202, in other embodiments, the EMG electrodes 1204 may be dispersed over the sensor arm. The one or more electrode arrays may have any suitable shapes e.g., a circular, a square, a rectangular, or any other suitable shape. The sensor arm 1202 may be configured to provide a force to maintain contact between the face of the user and the EMG electrodes, which are located on a side of the sensor arm 1202, facing the user 1230.

In some embodiments, the sensors 1205 may include a microphone for recording voiced or whispered speech, and an accelerometer or IMU for recording motion associated with speech. The sensors 1205 may additionally include sensors configured to measure a position of a user's tongue, blood flow of the user, muscle strain of the user, muscle frequencies of the user, temperatures of the user, and magnetic fields of the user, or a combination thereof, or any other suitable measurements. For example, the sensors 1205 may include photoplethysogram (PPG) sensors, photodiodes, optical sensors, laser doppler imaging, mechanomyography sensors, sonomyography sensors, ultrasound sensors, infrared sensors, functional near-infrared (fNIRS) sensors, sensors, capacitive electroglottography sensors, spectroscopy electroencephalogram (EEG) sensors, and magnetoencephalography (MEG) sensors, or any other suitable sensors.

With further reference to FIG. 12A, in some embodiments, the one or more sensors 1205 may include a reference electrode 1203. Ear hook 1201 may additionally support the reference electrode 1203. The reference electrode 1203 may be disposed on a side of the car hook 1201, facing the user 1230. In some examples, the reference electrode 1203 may be used in conjunction with the electrodes 1204 supported by the sensor arm 1202 as inputs to a differential amplifier. The reference electrode 1203 may provide a first potential or voltage to the user. The electrodes 1204 supported by the sensor arm 1202 may record electrical signals at the face of the user. The differential amplifier may take as inputs a voltage equal to that of the reference electrode 1203 and electrical signals recorded by the electrodes 1204 supported by the sensor arm 1202. The differential amplifier may amplify a difference between input voltages from electrical signals recorded by the reference electrode 1203 and the electrical signals recorded by the electrodes 1204, representing the voltage generated by the muscles in the face of the user. Additionally, the differential amplifier may suppress any voltages common to the two inputs. The reference voltage supplied to the face of the user by the reference electrode 1203 will be recorded by the electrodes 1204 supported by the sensor arm 1202, in addition to the voltage generated by muscles in the face of the user. In some embodiments, a suitable circuitry (e.g., a chip, an ASIC) for the differential amplifier may be contained within the wearable device 1200.

In some embodiments, the wearable device 1200 may include a speaker 1220 positioned at an end of the sensor arm. The speaker 1220 is positioned at the end of the sensor arm 1202 configured to be positioned proximate to the user's ear. In some embodiments, the speaker 1220 may be inserted into the user's ear to play sounds (e.g., via bone conducting). In some embodiments, the speaker 1220 may play sounds aloud adjacent to the user's ear. The speaker 1220 may be used to play outputs of silent speech processing or communication signals as discussed herein. For example, the speaker may play output of the speech model (1115 in FIG. 11A) via text to speech (TSS) techniques. In addition, the speaker 1220 may be used to play one or more outputs from a connected external device, or the wearable device, such as music, audio associated with video or other audio output signals. Although a limited number of components are shown in FIG. 12A, it is appreciated that the wearable device 1200 may include other components, which may be needed to make the wearable device 1200 functional. For example, the wearable device 1200 may include one or more processors 1212 configured to perform any operations as described above in FIGS. 10B and 11B, and further herein. Additionally, and/or alternatively, wearable device 1200 may include a speech model 1213 to convert sensor data from the sensors to text or encoded features as described above in FIGS. 11A-11B. Additionally, and/or alternatively, the wearable device 1200 may include a charging port, a data transfer port, or any other suitable components.

Figure 12B:
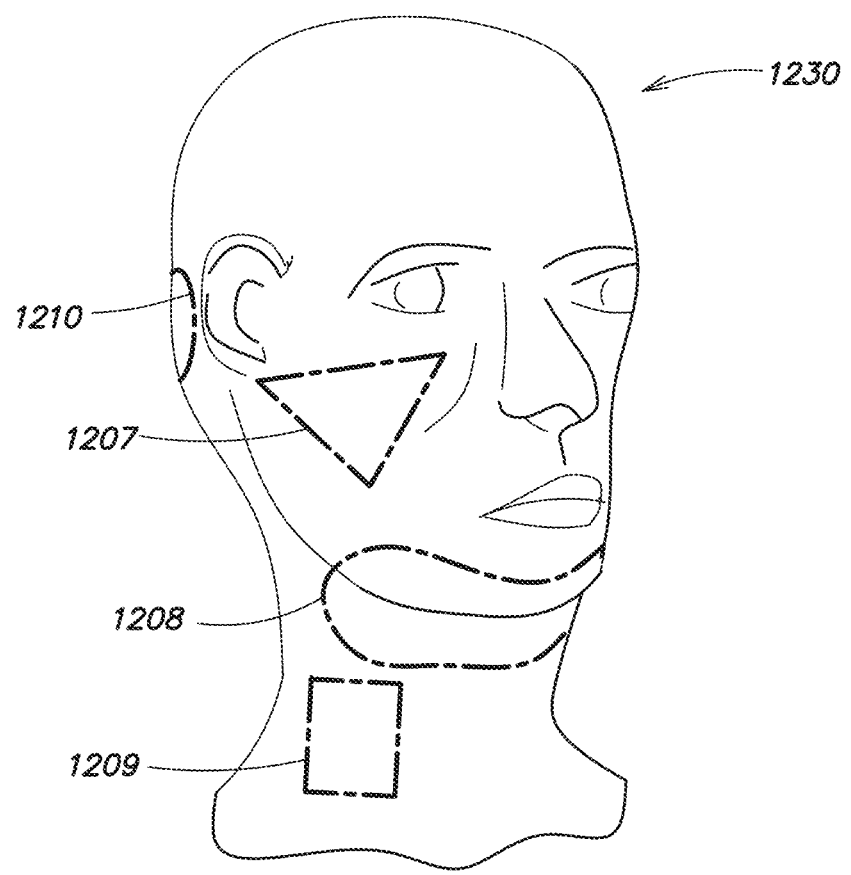
FIG. 12B is an illustration of wearable device target zone(s) associated with a wearable speech input device, in accordance with some embodiments of the technology described herein.

FIG. 12B is an illustration of wearable device target zone(s) associated with a wearable speech input device such as wearable device 1200 (FIG. 12A), in accordance with some embodiments of the technology described herein. The target zones may include one or more areas on or near the user's body part, in which sensor(s) can be placed to measure speech muscle activation patterns while the user is speaking (silently or with voice). For example, the speech muscle activation patterns at various target zones may include facial muscle movement, neck muscle movement, chin muscle movement, or a combination thereof associated with the user speaking. In some examples, the sensors may be placed at or near a target zone at which the sensors may be configured to measure the blood flow that occurs as a result of the speech muscle activation associated with the user speaking. Thus, the wearable device 1200 may be configured to have its sensors positioned to contact one or more target zones, such as the face and neck of the user.

With further reference to FIG. 12B, various target zones are shown. In some embodiments, a first target zone 1207 may be on the cheek of the user 1230. This first target zone 1207 may be used to record electrical signals associated with muscles in the face and lips of the user, including the zygomaticus of the user, the masseter of the user, the *buccinator* of the user, the *risorius* of the user, the platysma of the user, the *orbicularis oris* of the user, the depressor *anguli oris* of the user, the depressor *labii*, the *mentalis*, and the depressor septi of the user.

In some embodiments, various sensors may be positioned at the first target zone 1207. For example, electrodes (e.g., 1204 in FIG. 12A) supported by the wearable device 1200 (e.g., via a sensor arm 1202) may be positioned to contact the first target zone 1207 of the user. In some embodiments, sensors configured to measure the position and activity of the user's tongue may be supported at the first target zone 1207 by the sensor arm. In some embodiments, accelerometers configured to measure movement of the user's face may be placed at the first target zone 1207.

In some embodiments, a second target zone 1208 is shown along the jawline of the user. The second target zone 1208 may include portions of the user's face above and under the chin of the user. The second target zone 1208 may include portions of the user's face under the jawline of the user. The second target zone 1208 may be used to measure electrical signals associated with muscles in the face, lips jaw and neck of the user, including the depressor *labii inferioris* of the user, the depressor *anguli oris* of the user, the *mentalis* of the user, the *orbicularis oris* of the user, the depressor septi of the user, the *mentalis* of the user, the platysma of the user and/or the *risorius* of the user. Various sensor may be placed at the second target zone 1208. For example, electrodes (e.g., 1204 in FIG. 12A) supported by the wearable device 1200 (e.g., via a sensor arm 1202) may be positioned to contact the second target zone 1208. Additional sensors, e.g., accelerometers, may be supported by the wearable device and positioned at the second target zone 1208 to measure the movement of the user's jaw. Additional sensor may also include sensors configured to detect the position and activity of the user's tongue.

In some embodiments, a third target zone 1209 is shown at the neck of the user. The third target zone 1209 may be used to measure electrical signals associated with muscles in the neck of the user, e.g., the sternal head of sternocleidomastoide of the user, or the clavicular head of sternocleidomastoideous sensors may be positioned at the third target zone 1209. For example, accelerometers may be supported at the third target zone to measure vibrations and movement generated by the user's glottis during speech, as well as other vibrations and motion at the neck of user 1230 produced during speech.

In some embodiments, a reference zone 1210 may be located behind the ear of the user at the mastoid of the user. In some embodiments, reference electrodes (e.g., 1203 in FIG. 12A) may be positioned to contact the reference zone 1210 to supply a reference voltage to the face of the user, as discussed herein. Reference zone 1210 may also include portions of the user's head behind and above the ear of the user.

With reference to FIGS. 12A and 12B, as discussed with reference to multiple target zones for measuring the user's speech muscle activation patterns associated with the user speaking, the wearable device 1200 may include various mechanisms to adjust the positions of sensors for accommodating one or more target zones. For example, the sensor arm (e.g., 1202) of the wearable device 1200 may be adjustable along the axis of the sensor arm to enable the electrodes (e.g., 1204 in FIG. 12A) on the sensor arm to align with a target zone. In some embodiments, one or more parts of the wearable device 1200 may be moveable laterally, for example, to enable the sensor(s) thereon to be closer or further away from the user's body part (e.g., face or neck). In some embodiments, the wearable device 1200 may include multiple sensor arms wearable on both sides of the face to enable multiple sets of sensors on either or both sides of the face or neck. It is appreciated that other suitable configurations may be possible to enable any sensors to be suitably positioned in respective target zones.

Figure 13:
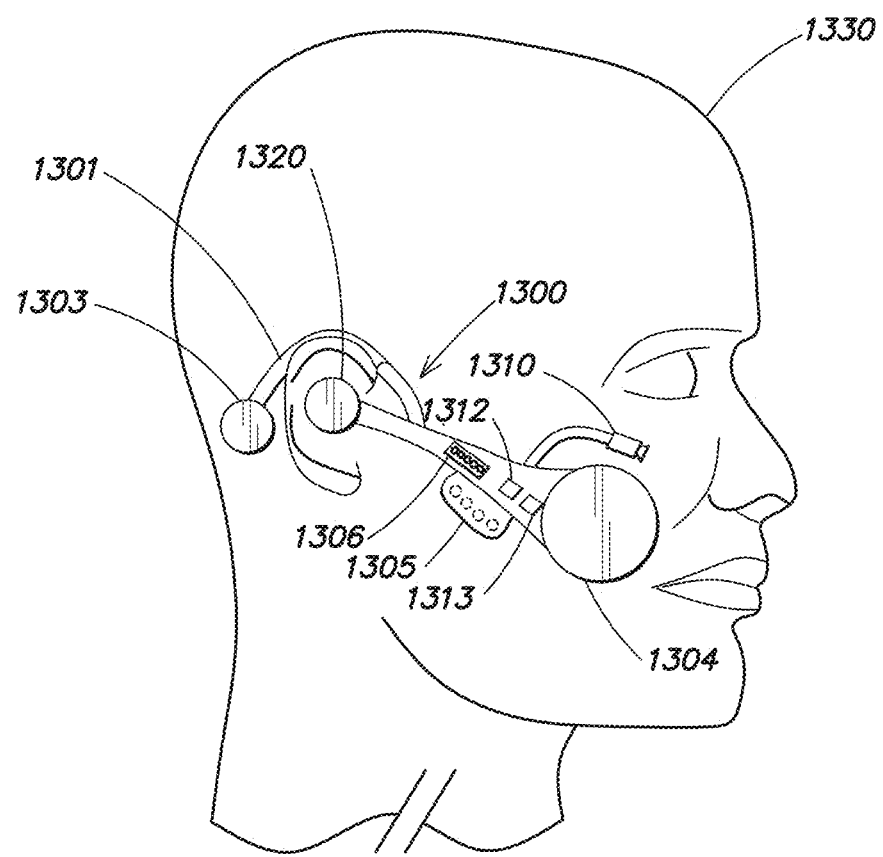
FIG. 13 is a view of a wearable speech input device with a camera integrated into the sensor arm, in accordance with some embodiments of the technology described herein.

FIG. 13 is a view of a wearable speech input device 1300 with a camera integrated into the sensor arm, in accordance with some embodiments of the technology described herein. Wearable device 1300 may be similar in structure to wearable device 1200 (FIG. 12A) and have similar components. For example, wearable device 1300 may include a sensor arm 1302, ear hook 1301, speaker 1320, one or more inputs 1306, one or more sensors 1305, one or more electrodes 1304, reference electrodes 1303, one or more processors 1312, and optionally a speech model 1313, where these components are similar to the components with numerals alike in FIG. 12A. In some embodiments, FIG. 13 may additionally include one or more cameras 1310 supported by the sensor arm 1302, where the one or more cameras are configured to record video of the mouth of the user when the user is speaking, or the environment (e.g., office, a public site) in which the user is when the user is speaking.

In non-limiting examples, the one or more cameras may include a first camera 1310 directed towards the face of the user. The camera 1310 may be supported by sensor arm 1302. The camera 1310 directed towards the face of the user may be used to record video of the mouth of the user. The video of the mouth of the user may be used in determining the one or more output words or phrases from the speech signals recorded by the wearable device 1300. For example, a computer vision machine learning model may be trained to determine words or phrases from videos of a user speaking. The computer vision machine learning model may be maintained on the wearable device 1300, on a connected external device or on a cloud computer server accessible by the wearable device 1300 or the connected external device. The video signals recorded from the camera 1300 directed towards the face of the user may be processed with other speech signals as discussed herein.

In some embodiments, the wearable device 1300 may also support a camera directed towards the environment of the user 1330 (e.g., an office, a public site such as a park, on a train or bus, in a store, in a bank, at an airport etc.). Video signals of the environment of the user may be processed as discussed herein to provide context of the user's speech. In some embodiment, the context may be provided to an application with which the speech input device is communicating to enhance the output of the application. In non-limiting examples as described above and further herein, the application may be a user interaction system configured to provide the text prompt or encoded features from the speech input device to a knowledge system to take actions or generate responses. The user interaction system may use the context information (e.g., the environment in which the user is speaking) to further improve the accuracy of the knowledge system.

Figure 14:
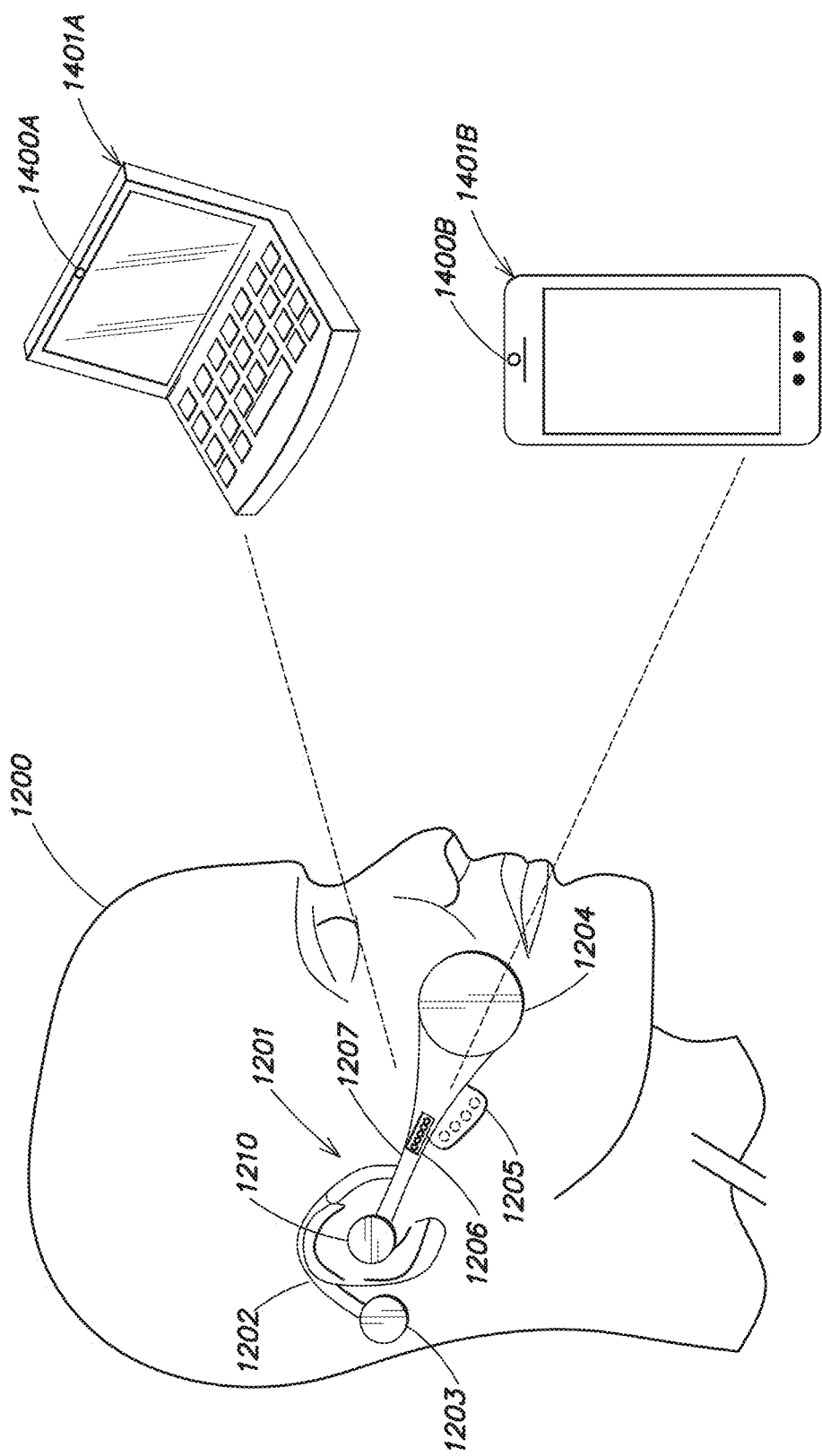
FIG. 14 illustrates a system in which a wearable speech input device is in communication with an external device, in accordance with some embodiments of the technology described herein.

FIG. 14 illustrates a system in which a wearable speech input device 1400 is in communication with an external device, in accordance with some embodiments of the technology described herein. Wearable device 1400 may be similar in structure to wearable devices 1200, 1300 (FIGS. 12A, 13) and have similar components, such as sensor arm 1402, car hook 1401, speaker 1420, one or more inputs 1406, one or more sensors 1405, one or more electrodes 1404, reference electrodes 1403, one or more processors 1412, and optionally a speech model 1413, all of which are similar to the components with numerals alike in FIGS. 12A and 13. In some embodiments, wearable device 1400 may be configured to be in communication with one or more external devices, e.g., 1410A, 1410B, where the combination of the wearable device 1400 and the external devices 1410 may enable any suitable system that utilizes the silent speech from the wearable device.

In some embodiments, wearable device 1400 may record silent and/or voiced speech signals of the user from the one or more sensors and transmit the text or encoded features of the user's speech (e.g., obtained from a speech model on the wearable device) to the external device, where the wearable device 1400 has a build-in speech model such as in the embodiment in FIG. 11A. Alternatively, and/or additionally, the wearable device 1400 may record silent and/or voiced speech signals of the user from the one or more sensors and transmit the signals (sensor data) to the external device, where the external device has a speech model to predict text or encoded features using the sensor data, and further provide the predicted text or encoded features to an application to take one or more actions. For example, the external device 1410A or 1410B may use the text or encoded features from the user's speech (e.g., via the speech model) to control one or more aspects of the connected the external device 1410A or 1410B. For example, the signals obtained from the one or more sensors (e.g., 1411, 1406) associated with the user's speech may be used to control a user interface of the connected external device, to control an application of the device, to provide an input to the device, to retrieve information from the device or to access or control one or more additional functions of the device, as discussed herein.

Figure 15:
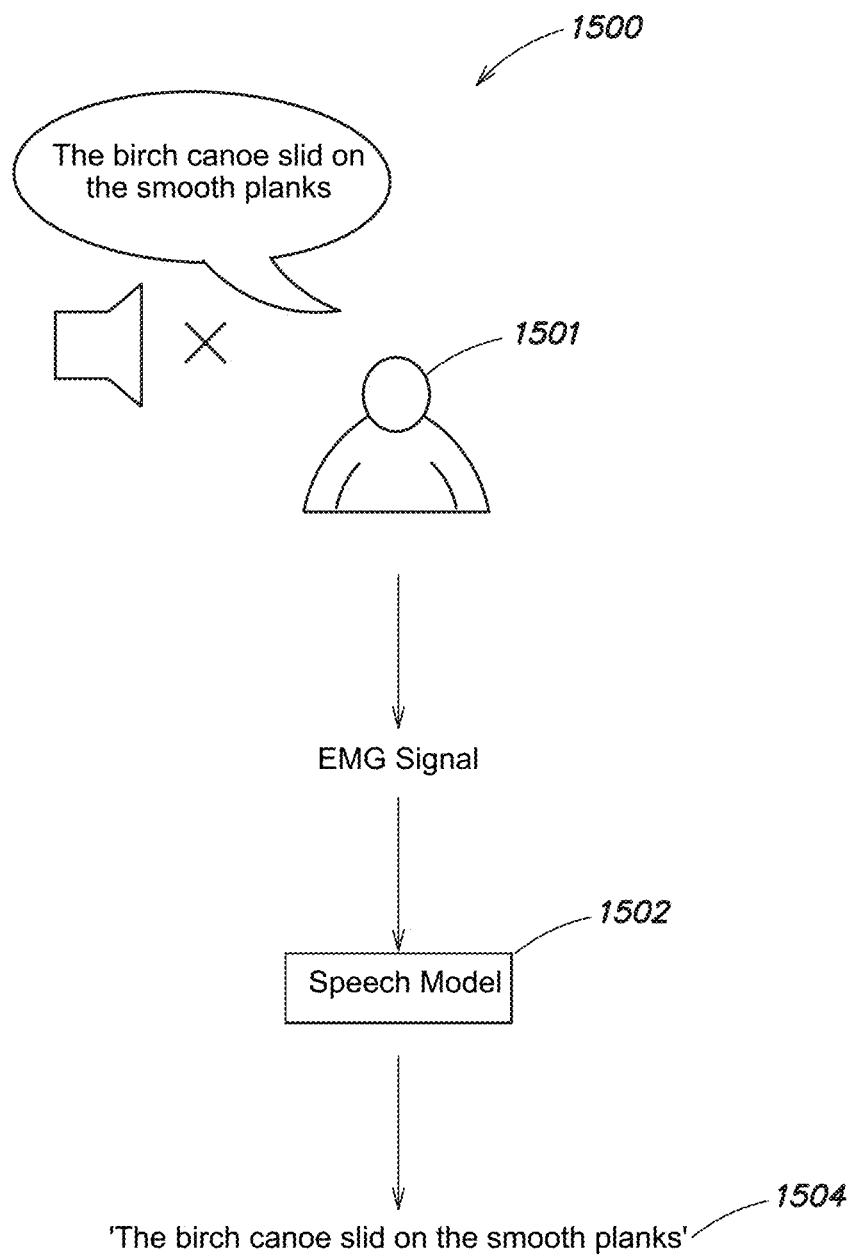
FIG. 15 is a scheme diagram of a speech model configured to decode speech to predict text using EMG signals, in accordance with some embodiments of the technology described herein.

FIG. 15 is a scheme diagram of a speech model configured to decode speech to predict text or encoded features using EMG signals, in accordance with some embodiments of the technology described herein. In some embodiments, the speech model 1502 may be trained and installed in a speech input device (e.g., 1000 in FIG. 10A, 1100 in FIG. 11A, 1200 in FIG. 12A, 1300 in FIG. 13, 1400 in FIG. 14). Alternatively, the speech model 1502 may be installed in an external device (e.g., 1050 in FIG. 10A, 1410A, 1410B in FIG. 14). When deployed (for inference), the speech model 1502 may be configured to receive sensor data indicative of the user's speech muscle activation patterns (e.g., EMG signals) associated with the user's speech (voiced or silent) and use the sensor data to predict text or encoded features. As shown in FIG. 15, the user speaks silently "The birch canoe slid on the smooth planks." The speech model 1502 receives the EMG signals associated with the user's speech, where the EMG signals indicate the speech muscle activation patterns as discussed above and further herein. The speech model 1502 outputs the text "The birch canoe slid on the smooth planks."

In some embodiments, the sensor data indicating the user's speech muscle activation patterns, e.g., EMG signals, may be collected using a speech device such as shown and described in embodiments in FIGS. 10A, 11A, 12A, 13, and 14. The speech model 1502 may be trained to use the sensor data to predict text or encoded features. Although it is shown that the EMG signals is associated with the user speaking silently, it is appreciated that the EMG signals may also be associated with the user speaking loudly, or in whisper, and may be used train the speech model to predict the text or encoded features. Thus, domain of the signals used for inference (target domain) and the domain for signals for training the speech model (source domain) may vary, as will be further described.

In some embodiments, training data for the speech model 1502 may be associated with a source domain (collection domain). In some embodiments, the source domain may be a voiced domain, where the signals indicating the user's speech muscle activation patterns are collected from voiced speech of training subject(s). In some embodiments, the source domain may be a whispered domain, where the signals indicating the user's speech muscle activation patterns are collected from whispered speech of training subject(s). In some embodiments, the source domain may be a silent domain, where the signals indicating the user's speech muscle activation patterns are collected from silent speech of training subject(s).

As described herein in the present disclosure, voiced (vocal) speech may refer to a vocal mode of phonation in which the vocal cords vibrate during at least part of the speech for vocal phonemes, creating audible turbulence during speech. In a non-limiting example, vocal speech may have a volume above a volume threshold (e.g., 40 dB when measured 10 cm from the user's mouth). In some examples, silent speech may refer to unvoiced mode of phonation in which the vocal cords are abducted so that they do not vibrate, and no audible turbulence is created during speech. Silent speech may occur at least in part while the user is inhaling, and/or exhaling. Silent speech may occur in a minimally articulated manner, for example, with visible movement of the speech articulator muscles, or with limited to no visible movement, even if some muscles such as the tongue are contracting. In a non-limiting example, silent speech have a volume below a volume threshold (e.g., 30 dB when measured about 10 cm from the user's mouth). In some examples, whispered speech may refer to unvoiced mode of phonation in which the vocal cords are abducted so that they do not vibrate, where air passes between the arytenoid cartilages to create audible turbulence during speech.

In some embodiments, the target domain (e.g., a domain used for inference) may preferably be silent domain. In some embodiments, the target domain may be whispered domain. It is appreciated, that the target domain may also be voiced domain or any other domain. In some embodiments, the source domain may be voiced domain, whispered domain, silent domain, or a combination thereof. For example, the training data for the speech model may be collected from both voiced speech and silent speech, each contributing to a respective portion of the training data.

Figure 16:
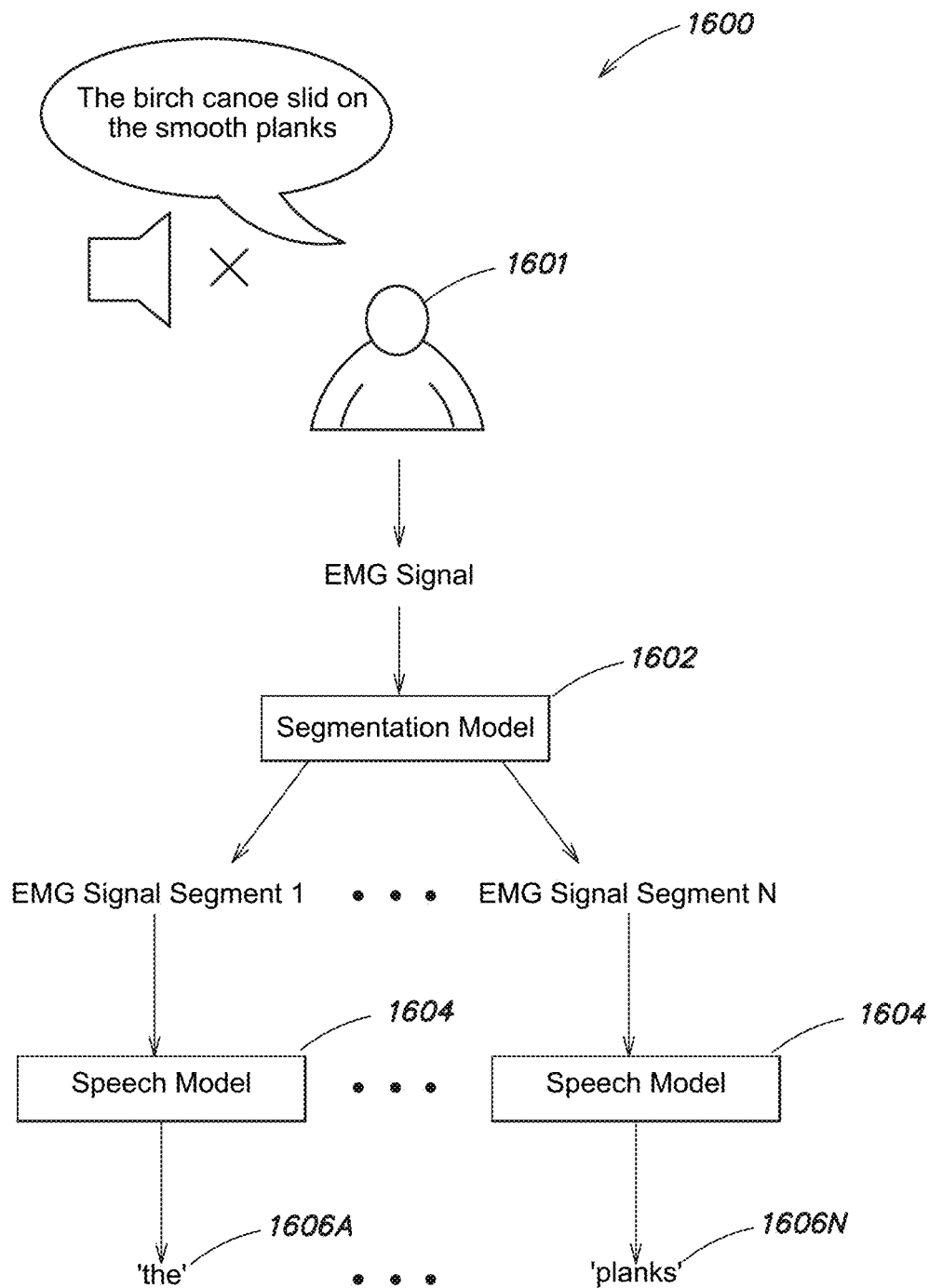
FIG. 16 is a scheme diagram of a speech model configured to decode speech to predict text using EMG signal and segmentation of the EMG signals, in accordance with some embodiments of the technology described herein.

FIG. 16 is a scheme diagram of a speech model 1604 configured to decode speech to predict text or encoded features using EMG signals and segmentation of the EMG signals, in accordance with some embodiments of the technology described herein. As shown, FIG. 16 is similar to FIG. 15 with a difference in that the signals indicating the user's speech muscle activation patterns (e.g., EMG signals) are segmented by a segmentation model 1602 before being provided to the speech model 1604. In the example shown, the EMG signals are segmented into a number of segments (e.g., 1, 2, . . . . N). These EMG signal segments are provided to the speech model 1604, which is configured to output the text corresponding to each of the EMG signal segments. In some embodiments, the EMG signals are segmented by word, for example, the speech "The birch canoe slid on the smooth planks" is segmented by eight segments each corresponding to a respective word in the speech. As shown, the speech model 1604 may output eight words each corresponding to a respective EMG signal segment. Although it is shown that segmentation model 1602 segments the EMG signals by word, it is appreciated that the segmentation model may also be trained to segment the EMG signals in any other suitable manner, where each segment may correspond to a phoneme, a syllabus, a phrase, or any other suitable segment unit. Accordingly, the speech model 1604 may be trained to predict text that corresponds to a signal segment (e.g., EMG signal segment), where a segment may correspond to a segmentation unit, e.g., a sentence, a phrase, a word, a syllable etc. In some embodiments, training a speech model (e.g., 1604) for predicting text segments may including generating segmented training data, the details of which are further described with respect to FIG. 17.

Figure 17:
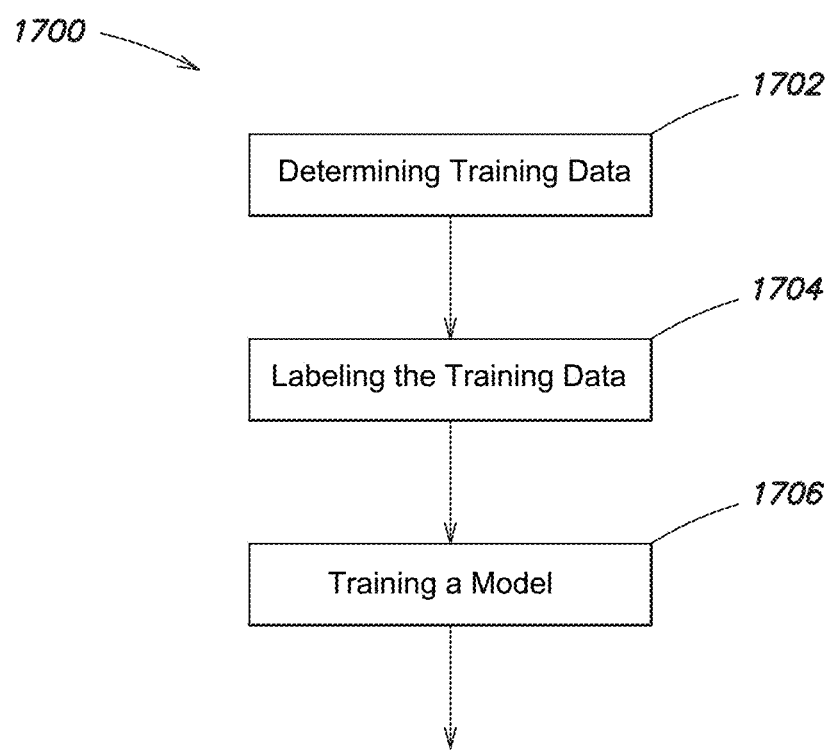
FIG. 17 is a flow diagram of an example process for training a speech model, in accordance with some embodiments of the technology described herein.

FIG. 17 is a flow diagram of an example process 1700 for training a speech model, in accordance with some embodiments of the technology described herein. As described herein (e.g., with reference to FIGS. 10A, 11A, 12A, 13, and 14), the speech model being trained may be embedded in a speech input device or in an external device external to the speech input device. In some embodiments, training process 1700 may include determining training data at act 702, labeling the training data at act 704, and using the labeled training data to train a model at act 706. These acts are further described in detail.

In some embodiments, act 702 may be performed for an individual user, for a group of users, for one or more collection domains (as described above and further herein), and/or otherwise performed. In some embodiments, training data may be generated in one or more sampling contexts at act 702. A sampling context may refer to an environment in which the training data is generated. For example, a sampling context may include the training subject being presented with a prompt (e.g., in a data collection center), and speaking the prompt in the source (collection) domain (e.g., voiced, whispered, silent, etc.). The prompt may be text (e.g., a script), audio prompt, and/or any other prompt. In some embodiments, a training system may output the prompt (e.g., display a phrase on a screen, or play an audio prompt in an audio device) to a training subject and ask the training subject to repeat the phrase using voiced speech, whispered speech, and/or silent speech.

In non-limiting examples, the training system may ask the training subject to use voiced speech in one or more voiced speech trials, to use silent speech in one or more silent speech trials, and/or to use whispered speech in one or more whispered speech trials, where each trial corresponds to a single prompt or a set of prompts. In some embodiments, voiced speech trials may be arranged between sets of silent speech trials. For example, a voiced speech trial may be used every K silent speech trials, where K may be in a range of 1-1000, or 5-100, or may be in a range greater than a threshold value, e.g., greater than 1000.

In some embodiments, the training system may provide auditory feedback to improve the accuracy of training data collection, training data labeling, and/or otherwise improve the model training. For example, the auditory feedback may include voice converted from the inferred text from the silent or whispered speech, where the training system may play back the auditory feedback to the training subject during the training data collection.

In some embodiments, prompts in collecting the training data may be segmented. For example, the training subject and/or another person may optionally delineate the start and/or end of each: prompt, sentence within the prompt, word within the prompt, syllable within the prompt, and/or any other segment of the prompt. Additionally, and/or alternatively, auxiliary measurements (e.g., video of the training subject while speaking, inertial measurements, audio, etc.) sampled during test subject speaking may be used to determine the prompt segmentation (e.g., each segment's start and end timestamps).

In some embodiments, a sampling context for generating training data may not include a prompt. Rather, training data may be collected during spontaneous speech. For example, the training data is sampled when the training subject may speak (e.g., voiced, whispered, silent, etc.) and/or perform other actions in their usual environment (e.g., attending meetings, taking phone calls, etc.). In such context, background training data can be collected, where the background training data includes user's speech responsive to operation mode selection by the user (e.g., turning on the device, user indication to interpret the signals, etc.) and/or without operation mode selection by the user (e.g., continuous data collection, automatic data collection responsive to a sensed event, etc.). In some embodiments, background training data collected without explicit prompts may enable training and/or calibrating a personalized speech model, training and/or calibrating a continual (e.g., outside of data collection centers; while all or parts of the system are not in active use for silent speech decoding and/or for controlling a device based on decoded silent speech; etc.), decreasing silent speech decoding errors, and/or providing other advantages.

In some embodiments, sampling context for generating training data may include other scenarios, e.g., the user's action associated with speaking. For example, the sampling context may include user sitting, walking, jumping up and down, or taking other actions when speaking. In some embodiments, training data may be collected by using one or more measurement systems containing one or more sensors such as described herein (see FIGS. 10A, 11A, 12A, 13, 14, for example). In some embodiments, the measurement systems may include an electrophysiology measurement system including one or more sensors configured to captured one or more types of signals that indicate the user speech muscle activation patterns associated with the user's speech, e.g., EMG signals, EEG signals, EOG signals, ECG signals, EKG signals, etc. or other suitable biometric measurement systems. In some embodiments, the measure systems may include one or more of: motion sensor (e.g., IMU), microphone, optical sensors configured to detect the movement of the user's skin (e.g., infrared cameras with a dot matrix projector), video cameras configured to capture images, videos, motion capture data, etc., sensors configured to detect blood flow (e.g., PPG, fNIRS), thermal cameras, depth/distance sensors (e.g., ToF sensors), and/or any other measurement systems. Data collected from a measurement system can correspond to a measurement modality.

In some embodiments, EMG sensors may be placed on a training subject to capture the training data. For example, EMG sensors may be placed at or near any target zones, such as shown in FIG. 12B. For example, EMG sensors may be placed on and/or under the jaw, on the cheek, at and/or below the cheek bone, at and/or near the temporomandibular joint, and/or any other location on the face. In some embodiments, the EMG sensors may be positioned more than a threshold distance away from the face midline. The threshold distance may be between 2 cm-15 cm or any range or value therebetween but can alternatively be less than 2 cm or greater than 15 cm. As such, EMG sensors may be less intrusive and/or more ergonomic. In some embodiments, EMG sensors may optionally be positioned on only one side of the user's face or on both sides of the face. The number of EMG sensors may be between 2-100 or in any range or value therebetween (e.g., 5-20), but can alternatively be less than 2 or greater than 100. During inference, EMG sensors may be placed in a similar region as they are placed in collecting the training data during training.

In some embodiments, training data may be synthetically generated. In some embodiments, training data captured in one domain may be used to generate training data in another domain. For example, synthetic silent domain measurements may be generated by sampling voiced domain measurements and subtracting the glottal vibrations (e.g., determined using an accelerometer, a microphone, etc.). In another example, a model may be trained to generate synthetic silent domain measurements based on voiced domain measurements (e.g., using paired silent and voiced measurements for the same training subject, for the same prompt, etc.). For example, the model can be trained using generative and/or de-noising methods (e.g., Stable Diffusion).

In some embodiments, a relationship between sets of source domain training data generated in different sampling contexts may be used to augment target domain training data. For example, voiced speech training data may include paired examples of a training subject using voiced speech across two or more sampling contexts (e.g., sitting, walking, jumping up and down, other actions, etc.). A mapping function may be inferred between two sampling contexts (e.g., sitting to walking), where the mapping function can be applied to silent speech training data sampled in the first sampling context to generate synthetic silent speech training data in the second sampling context. In some embodiments, synthetic training data may be generated by introducing artifacts and/or otherwise altering sampled training data.

With further reference to FIG. 17, act 704 may be performed to pair the training data with speech labels, where the training data may be indicative of a training subject's speech muscle activation patterns associated with the subject speaking (e.g., EMG measurements). Speech labels may include text, audio, word segmentation, phrase segmentation, intonation, and/or any other speech information associated with the training data. In some embodiments, a speech label may include a prompt (e.g., text from a prompt that was used for the training system to prompt the user to speak and thus collect training data). In some embodiments, a speech label may include text and/or audio determined based on ground truth measurements taken when the training data is being collected. Ground truth measurements may include sensor data associated with training data collection. For example, ground truth measurements may include audio, video, motion data, and/or any sensor data captured from other measurement modalities. In some embodiments, ground truth measurements may be collected in a ground truth measurement system. A ground truth measurement system may include: a microphone, a video camera, and/or one or more sensors as described above with respect to a speech input device (e.g., FIGS. 10A, 11A, 12A, 13, and 14) or any other suitable measurement devices.

In some examples, ground truth audio signals (e.g., captured from a microphone or a video camera) may be converted to a text speech label (e.g., using ASR or converted manually). In other examples, ground truth videos may be converted to a text speech label (e.g., using automated lip reading or converted manually). For example, facial kinematics may be extracted from a ground truth video of a training subject when speaking during the training data collection. Lip reading may use the extracted facial kinematics to convert the video to a text speech label. Additionally, and/or alternatively, ground truth measurements may be used to validate, correct, and/or otherwise adjust another speech label. For example, a speech label including a prompt text may be corrected based on a ground truth measurement as will be further described in detail with reference to FIG. 18.

Figure 18:
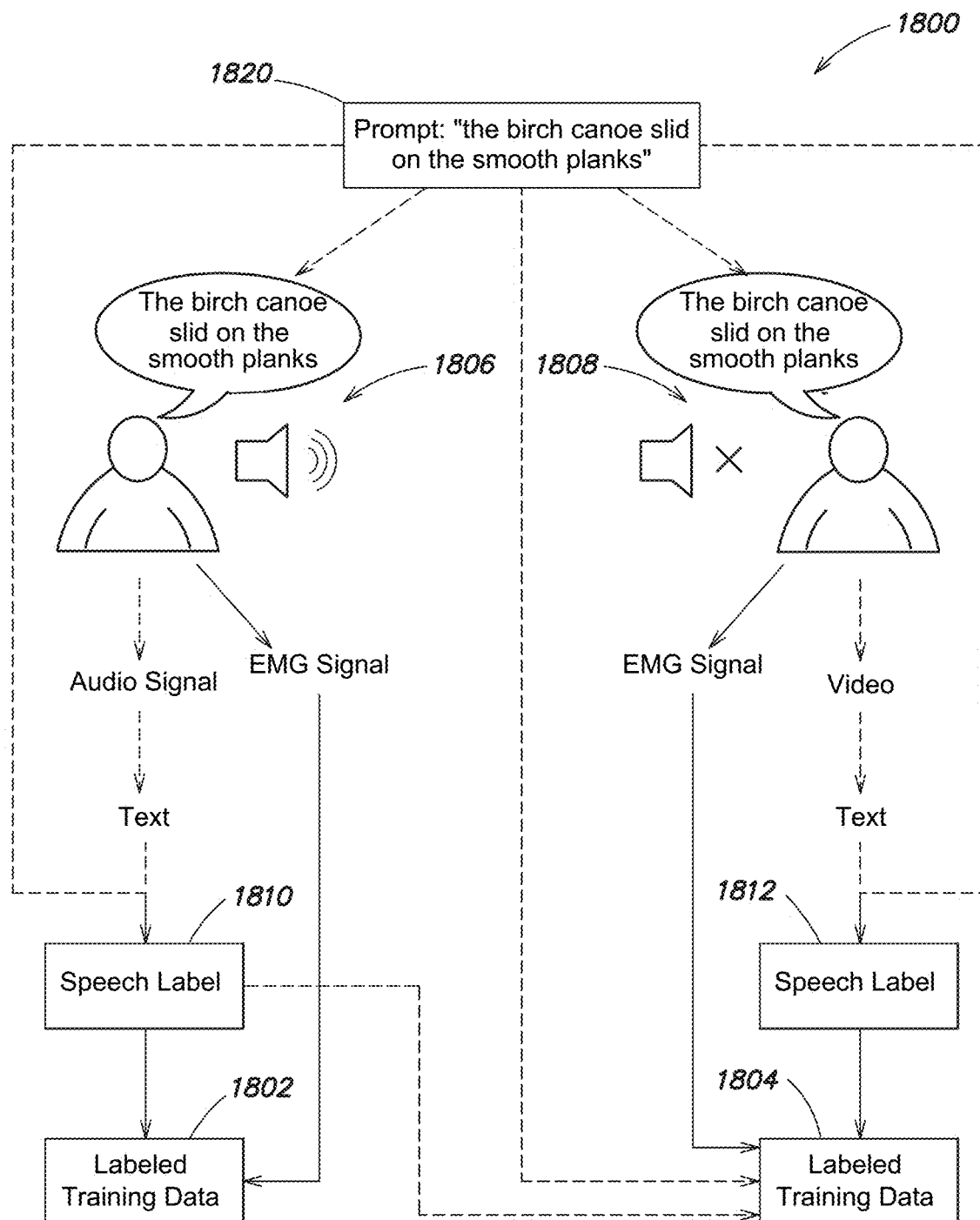
FIG. 18 is a scheme diagram of generating labeled training data for a speech model using different types of measurements to generate speech labels for the labeled training data, in accordance with some embodiments of the technology described herein.

FIG. 18 is a scheme diagram of generating labeled training data for a speech model using different types of measurements to generate speech labels for the labeled training data, in accordance with some embodiments of the technology described herein. Labeled training data may include paired training data and speech labels as described above and further herein. In some embodiments, in generating the labeled training data, a speech label associated with training data may be predetermined. For example, the speech label may include a prompt that was used to prompt the user to speak when collecting the training data. In some embodiments, in generating the labeled training data, speech labels associated with training data may be determined using ground truth measurements sampled concurrently with the training data, where the training data (e.g., EMG signals indicating a user's speech muscle activation patterns) and the speech labels may be generated from the same or different domains.

As shown in FIG. 18, labeled training data 1802 and labeled training data 1804 are generated respectively in a voiced domain 1806 (in which the user speaks in a voiced speech) and a silent domain 1808 (in which the user speaks silently). In the voiced domain 1806, the user is prompted with text 1820 and the user speaks the prompt in a voiced speech. EMG signals are collected (e.g., using any of the modalities as described above and further herein) while the user is speaking in the voiced speech. Ground truth audio signal collected from the user speaking may be converted (e.g., using ASR) to a text speech label 1810 to generate the labeled training data 1802. In the silent domain 1808, the user speaks the prompt in a silent speech. EMG signals are collected (e.g., using any of the modalities as described above and further herein) while the user is speaking silently. Ground truth video collected from the user speaking may be converted (e.g., using lip reading as described herein) to a text speech label 1812 to generate the labeled training data 1804.

In some embodiments, labeled training data generated in one domain may be corrected by ground truth measurements collected in another domain. For example, as shown in FIG. 18, labeled training data 1804 generated from the speech label in the silent domain 1808 may be corrected by the speech label 1810 that was generated using the ground truth measurements collected in the voiced domain 1806. In other variations, labeled training data 1802 may be generated from the speech label 1810 in the voiced domain and corrected from the speech label 1812 generated in the silent domain.

Returning to FIG. 17, labeling the training data at act 704 may include temporally align the speech labels to the training data. For example, the training data may be segmented (e.g., into sentences, phrases, words, syllables, etc.), wherein each training data segment is aligned to a respective speech label. In some embodiments, the training data may be segmented (e.g., manually or automatically) after the training data is collected. In some embodiments, the training data may be segmented while being collected. For example, the subject providing the speech training data or another person may manually segment the data while being collected. In some embodiments, the training data may be segmented (during or after the data collection) using measurements acquired during the training data collection. For example, the measurement acquired during the training data collection may include information indicative of the start/end time of each training data segment, details of which are further described.

In non-limiting examples, automatic speech recognition (ASR) may be used on sampled speech audio to detect the start/end time for each voiced segment (e.g., word, phrase, etc.), where the start/end time for each voiced segment may be used to determine the training data segment (e.g., EMG measurement) associated with the voiced segment. The ASR may be used concurrently while the speech audio is sampled. Alternatively, the ASR may be used after the speech audio is collected. In other non-limiting examples, lip reading (e.g., extracting facial kinematics from videos captured during the user speaking) may be used to detect the start/end time for each training data segment. The video may be captured using a speech input device having a camera, e.g., wearable device 1300 having a camera 1310 on the sensor arm (FIG. 13).

It is appreciated that the video may be captured in any other suitable manner, for example, from a camera on a desktop computer facing the user while the user is speaking. In other non-limiting examples, pause detection may be used to detect the start/end time of a training data segment. Pause detection may be applied to sensor data (e.g., speech audio from a microphone, EMG data from an EMG sensor, senser data from an inertial sensor, etc. collected during a user's speech) to delineate a start/end time of a training data segment. It is appreciated that, the training data segments, which are temporally aligned with speech labels, may be used to train the speech model to predict text from segmented signals associated with user speaking (e.g., EMG signals), such as described in embodiments in FIG. 16.

Although embodiments are described for training a speech model using segmented training data, it is appreciated that segmentation of training data may be optional. For example, the speech label may be a text prompt of a phrase, where the training data associated with the user speaking (e.g., voiced, whispered, silently, etc.) may be labeled with the entire text prompt.

With further reference to FIG. 17, at act 706, the speech model may be trained iteratively using self-supervised learning, semi-supervised learning, supervised learning, unsupervised learning, transfer learning, reinforcement learning, and/or any other suitable training method. In training the speech model, the training data may include target domain training data and/or source domain training data as described herein, e.g., in embodiments of FIG. 17. Target domain training data refers to data collected in the domain in which signals are used in inference, where source domain training data refers to data collected in the domain in which signals are used in training the speech model. Various methods may be used to process the target domain training data and source domain training data, the details of which are further described with reference to FIG. 19.

Figure 19:
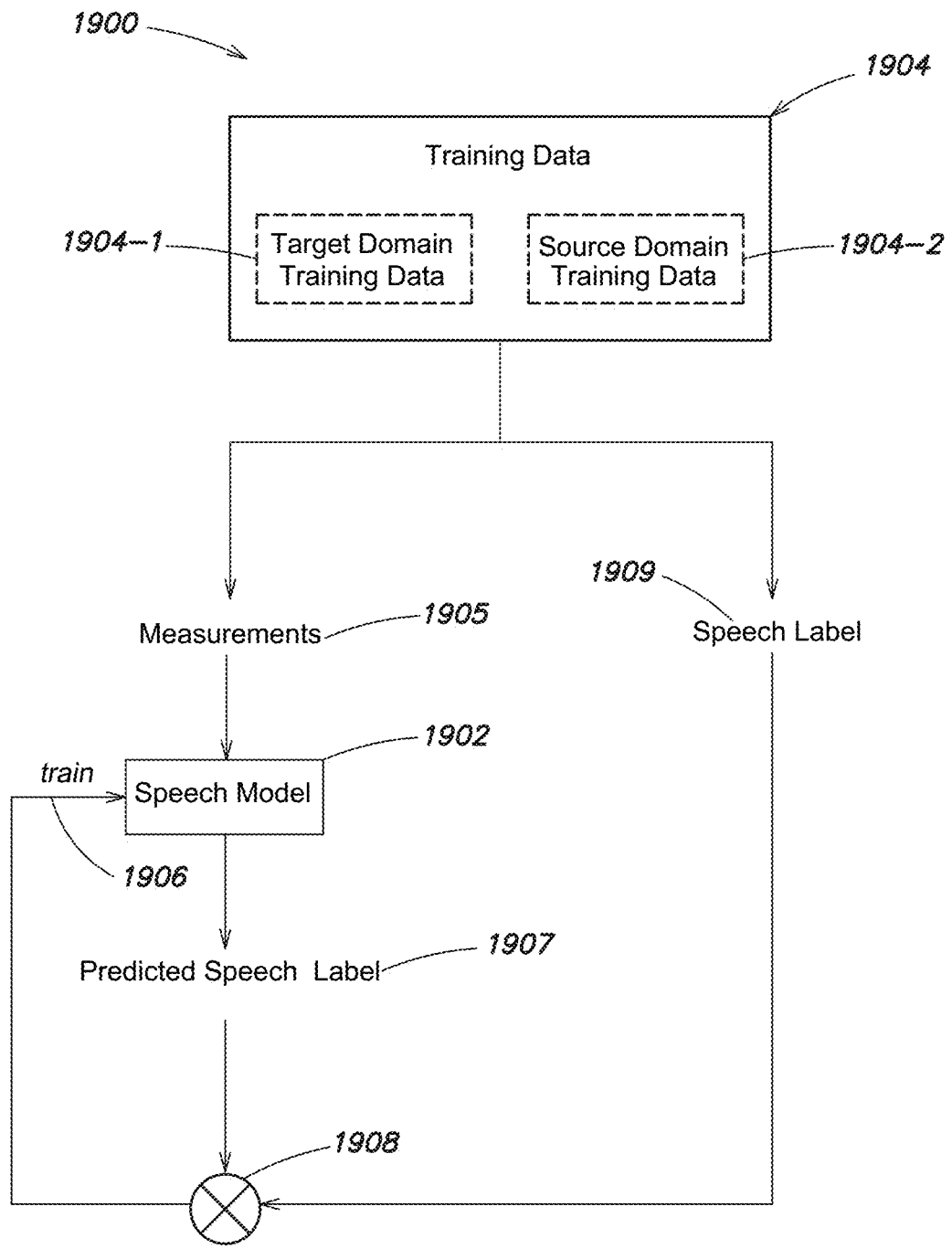
FIG. 19 is a scheme diagram of training a speech model using training data collected in different domains, in accordance with some embodiments of the technology described herein.

FIG. 19 is a scheme diagram 1900 of training a speech model using training data collected in different domains, in accordance with some embodiments of the technology described herein. The speech model 1902 may be trained using a combination of target domain training data and source domain training data 1904, where the target domain training data and the source domain training data may be combined in different manners. In some embodiments, the training data 1904 may include randomly shuffling source domain training data 1904-2 and target domain training data 1904-1. In some embodiments, the speech model 1902 may be initially trained using source domain training data (e.g., only source domain training data, above a threshold proportion of source domain training data, etc.). In subsequent training iterations, an increased proportion of target domain training data may be used. In other embodiments, the speech model 1902 may be initially trained using source domain training data, and subsequently, the speech model 1902 may be tuned using target domain training data. It is appreciated that the target domain training and source domain training data may be combined in other suitable manners.

Although embodiments of dividing training data into target domain training data and source domain training data are shown in FIG. 19, in other variations, the speech model may optionally be trained using training data that includes different measurement modalities such as described above and further herein. In some embodiments, a subset of the modalities may be selected (e.g., for a training iteration, for a set of measurements, for a training subject, etc.). For example, the speech model may be initially trained using audio signals and EMG signals labeled with speech labels. In subsequent training iterations, only EMG signals and no audio signals are used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit module, including commercially available integrated circuit modules known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but the processor functions may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, modules, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of modules set forth in the foregoing description or illustrated in the drawings. For example, aspects described in one embodiment may be combined in any manner with aspects described in other embodiments.

Various aspects of the technology described herein may be used alone, in combination, or in a variety of arrangements with any of the embodiments shown or described in U.S. application Ser. No. 18/338,827 filed Jun. 21, 2023 entitled WEARABLE SILENT SPEECH DEVICE, SYSTEMS, AND METHODS, and/or U.S. application Ser. No. 18/338,749 filed Jun. 21, 2023 entitled SYSTEMS AND METHODS FOR USING SILENT SPEECH IN A USER INTERACTION SYSTEM. The entire contents of which are incorporated herein by reference and form an integral part of this application.

Also, the technology described herein may be embodied as a method, of which examples are provided herein. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within +20% of a target value in some embodiments, within +10% of a target value in some embodiments, within +5% of a target value in some embodiments, within +2% of a target value in some embodiments. The terms "approximately" and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system comprising:
    a speech input device wearable on a user and configured to measure a first EMG signal indicative of a prompt provided by the user, wherein the first EMG signal is measured when the user is speaking the prompt; and
    at least one processor configured to:
        provide text-based or voice-based prompt information associated with the prompt provided by the user to an interactive system to cause the interactive system to take an action to control an application of the interactive system or generate a response to the prompt based on the provided prompt information, wherein the prompt information is determined at least in part based on the first EMG signal indicative of the prompt provided by the user;
        receive a second EMG signal responsive to the user making a facial expression responsive to the action or the response;
        use a machine learning model and the second EMG signal as input to the machine learning model to determine a feedback signal, wherein:
            the machine learning model is configured to determine an indication of the facial expression the user is making responsive to the interactive system taking the action or generating the response based at least in part on the second EMG signal, and
            the feedback signal is determined based at least in part on the indication of the facial expression; and
        provide the feedback signal to the interactive system to cause the interactive system to take a new action or generate a new response in response to the feedback signal and the provided prompt information.

2. The system according to claim 1, wherein the feedback signal indicates a degree of confirmation to the response.

3. The system according to claim 2, wherein the system further comprises a knowledge system, and wherein the degree of confirmation to the response is used to determine whether the knowledge system takes an action that was indicated by the response.

4. The system according to claim 1, wherein the feedback signal is used by the interactive system to generate a response to the user that includes a question.

5. The system according to claim 4, wherein the system receives and processes a second prompt provided by the user response to the question.

6. The system according to claim 5, wherein the first and second prompts are provided as inputs to a knowledge system.

7. The system according to claim 1, wherein the interactive system is configured to sample a new input or response based on the feedback signal.

8. The system according to claim 2, wherein the feedback signal includes an indication of a facial or a head gesture.

9. The system according to claim 8, wherein the feedback signal includes an indication of a frown, a smile, a head nod, or a head shake.

10. The system according to claim 8, wherein the feedback signal indicates a frown, and the indication of the frown is used to cancel or clarify the prompt.

11. The system according to claim 8, wherein the feedback signal indicates a smile, and the indication of the smile is used to confirm the action or the response.

12. The system according to claim 1, wherein the at least one processor is further configured to generate a second prompt and is configured to:
receive a third EMG signal from the speech input device when the user is speaking; and
use a second machine learning model and the third EMG signal as input to the second machine learning model to generate the second prompt.

13. The system according to claim 1, wherein the at least one processor is configured to:
provide a text prompt to a knowledge system to cause the knowledge system to perform an operation and/or generate a response;
receive a feedback signal responsive to the performed operation or the response;
cause the knowledge system to, based on the feedback signal, take a new operation different from the performed operation or generate a new response different from the generated response.

14. The system according to claim 13, wherein the feedback comprises receiving a signal from the user that the knowledge system did not perform the operation or provide the response that the user desired.

15. The system according to claim 13, further comprising:
a speech input device wearable on a user and configured to receive a third EMG signal when the user is speaking;
receive a fourth EMG signal when the user is making a facial expression responsive to the action or the response;
use a machine learning model and the fourth EMG signal as input to the machine learning model to determine the feedback signal.

16. The system of claim 15, wherein the feedback signal indicates one of a smile, a frown, or a head gesture.

17. A computer-implemented method used in a distributed computer system, the method comprising acts of:
measuring, by a speech input device wearable on a user, a first EMG signal indicative of a prompt provided by the user when the user is speaking the prompt; and
providing text-based or voice-based prompt information associated with the prompt provided by the user to an interactive system to cause the interactive system to take an action to control an application of the interactive system or generate a response to the prompt based on the provided prompt information, wherein the prompt information is determined at least in part based on the first EMG signal indicative of the prompt provided by the user;
receiving a second EMG signal responsive to the user making a facial expression responsive to the action or the response;
using a machine learning model and the second EMG signal as input to the machine learning model to determine a feedback signal by:
determining, with the machine learning model, an indication of the facial expression the user is making responsive to the interactive system taking the action or generating the response based at least in part on the second EMG signal, and
determining the feedback signal at least in part based on the indication of the facial expression; and
providing the feedback signal to the interactive system to cause the interactive system to take a new action or generate a new response in response to the feedback signal and the provided prompt information.

18. The method according to claim 17, wherein the feedback signal indicates a degree of confirmation to the response.

19. The method according to claim 18, wherein the system further comprises a knowledge system, and wherein the degree of confirmation to the response is used to determine whether the knowledge system takes an action that was indicated by the response.

20. The method according to claim 19, further comprising using the feedback signal by the knowledge system to generate a response to the user that includes a question.

21. The system according to claim 20, further comprising receiving and processing a second prompt provided by the user response to the question.

22. The system according to claim 21, wherein the first and second prompts are provided as inputs to the knowledge system.

23. The system according to claim 17, wherein the interactive system is configured to sample a new input or response based on the feedback signal.

24. A non-transitory computer-readable medium containing instruction that, when executed, cause at least one computer hardware processor to perform a method comprising acts of:
measuring, by a speech input device wearable on a user, a first EMG signal indicative of a prompt provided by the user when the user is speaking the prompt; and
providing text-based or voice-based prompt information associated with the prompt provided by the user to an interactive system to cause the interactive system to take an action to control an application of the interactive system or generate a response to the prompt based on the provided prompt information, wherein the prompt information is determined at least in part based on the first EMG signal indicative of the prompt provided by the user;
receiving a second EMG signal responsive to the user making a facial expression responsive to the action or the response;
using a machine learning model and the second EMG signal as input to the machine learning model to determine a feedback signal by:
determining, with the machine learning model, an indication of the facial expression the user is making responsive to the interactive system taking the action or generating the response based at least in part on the second EMG signal, and
determining the feedback signal at least in part based on the indication of the facial expression; and
providing the feedback signal to the interactive system to cause the interactive system to take a new action or generate a new response in response to the feedback signal and the provided prompt information.

25. The system of claim 1, wherein the new action taken by the interaction system or the new response generated by the interactive system is based at least in part in response to the prompt and the feedback signal.

* * * * *